(12) United States Patent
Lee et al.

(10) Patent No.: US 10,875,800 B2
(45) Date of Patent: Dec. 29, 2020

(54) METHODS AND APPARATUSES FOR WATER TREATMENT

(71) Applicants: Yee Chun Lee, San Jose, CA (US); Narayan Raju, Palo Alto, CA (US); Ah Beng Tan, San Jose, CA (US); Huei Meng Chang, Milpitas, CA (US)

(72) Inventors: Yee Chun Lee, San Jose, CA (US); Narayan Raju, Palo Alto, CA (US); Ah Beng Tan, San Jose, CA (US); Huei Meng Chang, Milpitas, CA (US)

(73) Assignee: Huei Meng Chang, Milpitas, CA (US)

( * ) Notice: Subject to any disclaimer, the term of this patent is extended or adjusted under 35 U.S.C. 154(b) by 933 days.

(21) Appl. No.: 14/217,059

(22) Filed: Mar. 17, 2014

(65) Prior Publication Data

US 2014/0263000 A1 Sep. 18, 2014

Related U.S. Application Data

(60) Provisional application No. 61/801,164, filed on Mar. 15, 2013.

(51) Int. Cl.
| | |
|---|---|
| *C02F 3/04* | (2006.01) |
| *C02F 3/34* | (2006.01) |
| *C02F 3/20* | (2006.01) |
| *C02F 101/32* | (2006.01) |

(52) U.S. Cl.
CPC .............. *C02F 3/04* (2013.01); *C02F 3/20* (2013.01); *C02F 3/34* (2013.01); *C02F 2101/322* (2013.01); *C02F 2303/16* (2013.01); *Y02W 10/10* (2015.05)

(58) Field of Classification Search
None
See application file for complete search history.

(56) References Cited

U.S. PATENT DOCUMENTS

| | | | | |
|---|---|---|---|---|
| 293,747 | A * | 2/1884 | Hyatt | B01D 24/005 210/271 |
| 1,015,326 | A * | 1/1912 | Kiefer | B01D 25/26 210/343 |
| 1,802,726 | A * | 4/1931 | Levine | C02F 3/04 134/25.5 |
| 3,232,434 | A * | 2/1966 | Albersmeyer | C02F 3/06 210/151 |
| 4,009,105 | A * | 2/1977 | Jeris | C02F 3/06 210/107 |
| 6,123,858 | A * | 9/2000 | Manz | B01D 24/14 210/104 |
| 6,428,691 | B1 * | 8/2002 | Wofford | C02F 3/288 210/151 |
| 2005/0284811 | A1 * | 12/2005 | Potts | C02F 3/04 210/617 |

\* cited by examiner

*Primary Examiner* — Jonathan M Peo

(57) ABSTRACT

A liquid filtration device comprises: filter modules, wherein each of the filter modules has a layer for a bio-film and a first group of particles; and a biobridge, wherein the biobridge is coupled to the filter modules, wherein an input liquid is disposed on the filter modules, and wherein for each of the filter modules the input liquid is filtered by passing through the respective layer and the respective first group of particles.

18 Claims, 24 Drawing Sheets

METHODS AND APPARATUSES FOR WATER TREATMENT

CROSS REFERENCE

This application claims priority from a provisional patent application entitled "Methods and Apparatuses for Water Treatment" filed on Mar. 15, 2013 and having an Application No. 61/801,164. Said application is incorporated herein by reference.

FIELD OF INVENTION

The disclosure relates to liquid and/or fluid filtration, and, more particularly, to methods and apparatuses for water treatment using biological filtering.

BACKGROUND

Although water desalination and purification methods and apparatuses, such as mechanical vapor compression distillation and reverse osmosis, are capable of producing potable water of varying degree of purity, they are generally incapable of removing or greatly reducing dissolved volatile organic chemicals which pose a number of health issues and concerns, including foul taste, toxicity, carcinogenicity, and other numerous adverse effects. Additionally, said apparatuses typically cannot accept raw input water without some pretreatments to remove sedimentations and inorganic chemicals which may cause fouling, plugging, and scaling of the water purification apparatuses.

Traditional pretreatment techniques commonly entail the use of fabric or membrane sedimentation filters, chlorination and activated carbon to remove pathogens, and anti-scaling chemicals or chemical flocculation to precipitate barely soluble metallic compounds to ensure that those compounds won't precipitate inside the water purification apparatuses. Unfortunately, such pretreatments typically require constant maintenance and replacement of the consumables, which are costly and require large amounts of energy to produce. Furthermore, the brines resulting from such pretreatments and from the water purification apparatuses contain large amount of highly toxic and ecologically harmful substances which would require additional treatments for their safe disposals.

One of the most potent environmentally friendly pretreatment filtration processes involves the naturally grown biological formations founded in the soil and aquatic environments to trap and process sedimentations and pathogens by a combination of mechanical and biological processes. The active biological formation typically exists as a gelatinous Schmutzdecke on the top few millimeters of a slow sand filter, or the microbial slime film layer on a media surface that processes and converts toxic chemicals in air or in aquatic environments to clean polluted, high volatile organic compounds ("VOC") content air or to scrub the water in closed aquaculture settings.

In addition to the Schmutzdecke zone, biological activities typically extends further down to a depth of about 5 cm or so, depending on the average and minimum grain sizes of the filtration sands. Beyond that, the lack of nutrients and oxygen essentially kills off all living microorganisms that had migrated into the "non-biological zone". Filtration in the non-biological zone is primarily of a mechanical nature and not biological except for a narrow "kill zone" just beyond the border between the biological zone and the non-biological zone.

Slow sand filters have been used for centuries for producing lower quality potable water from raw water. Since they are incapable of removing high salinity content from seawater, they are primarily only suitable for purifying surface water. However, as a pretreatment filtration means, they are still capable of biological and physical processes to remove pathogens and colloids. The biological processes are primarily governed by the respiration (aerobic) and metabolism (anaerobic) mechanism of the microorganisms. They have been shown to remove all but trace fractions of bacteria, viruses, and protozoa and other contaminants, turbidity causing colloids, as well as volatile organic and inorganic dissolved gases, as well as a large portion of heavy metals. As such, the slow sand filtration is a promising way to prepare the input seawater or brackish water ahead of the main water purification device.

Unfortunately, the slow sand filters and their point of use counterparts, the bio-sand filters, are far too area intensive, requiring extensive land area owing to the low filtration rate of no more than 0.1 gallon per minute per sq. ft. Most large municipal water treatment plants have abandoned the slow sand filtration, and instead opted for fabric/membrane filtration or rapid sand filtration which are much more costly and chemical intensive but require one tenth the land area for pretreatments.

Slow sand filtrations and their ilk typically utilize fine sands for both Schmutzdecke biological film and physical filtration to remove both microorganisms and suspended solids. It is generally recognized that the majority of biological cleaning processes takes place within the Schmutzdecke layer, and the bulk of fine sand stack is primarily responsible for mechanical filtration (trapping and adsorption of suspended and dissolved solids) and very limited bio starvation as the bulk of the fine sand stack lacks nutrients and possibly oxygen. However, it has been known that aeration of the fine sand stack enhances the aerobic predation of the pathogens within the Schmutzdecke film through oxygenation.

Since the entire sand stack is hundreds of times deeper than the thickness of the bio-film, and much of the physical trapping and adsorption already happened within the slimy, sticky bio film layer, the added benefits of the deep fine sand layer are minimal as they could be easily replaced by more efficient membrane filtration and other means. Thus it would be possible to drastically reduce the depth of the fine sand layer. Furthermore, the equally deep bottom gravel layer serves no filtration function, but instead is used merely for supporting the fine sand layer and to prevent the fine sands to infiltrate the collecting perforated pipes for the treated water.

Another reason for the bulkiness of the slow sand filter rests on the decision of its practitioners to avoid using mechanical power as much as possible and instead, relying on gravity to force the input water through the sand filtration layer. This led to the use of a standing water layer at least 1 meter in depth on top of the fine sand layer. The employment of a mechanical pump such as a low pressure diaphragm pump could provide the pressure head needed to force the input water with only a thin layer of standing water needed to ensure that the bio film is constantly moisturized.

Yet another reason for the need to have the large depth of the fine sand stack is to leave room for the sacrificial sands during sand scraping or wet sand harrowing maintenance operations when the Schmutzdecke grows too thick for the input water to filter through. Since such maintenance work needs to be performed at regular intervals of every few months, the thickness of the fine sand layer has to be increased correspondingly to avoid frequent resanding. Sand scraping effectively removes the bio film completely which causes a pause in the water treatment operation since the new sand surface would require a couple of weeks at the minimum to regrow the bio film. Wet harrowing can bring the service back much more quickly since it only involves stirring and light washing of the top sand layer which removes the entrapped suspended solids and bacteria wastes but preserving the bio film with some thinning while reducing the amount of sands lost to the operation.

Dissolved VOCs can also be removed from water by air stripping which pumps compressed air from below a packed media tower to transfer the VOCs from the trickling input water down the packed tower. Such filtration relies on Henry's law on low solubility volatile gases dissolved in liquid instead of biological processes. Although air stripping requires a large volume to operate, it has order of magnitude higher water filtration rate hence it does not require extensive land area to process.

Air stripping is the most effective when the Henry's law constant for the specific VOC is large, of the order of a few hundreds. Large Henry's law constant results in a large stripping coefficient, which in turns leads to a small air-to-water filtration rate, and hence smaller physical size and lower pumping power are needed to remove such VOC. Since the bio-film removes VOC via a different principle, VOC removal capabilities of the air stripper and bio filtering largely complement each other.

Since air stripping forces the air through water via percolation or through an increased film-air interface. The water is also oxygenated immensely during the air-water VOC transfer. Such oxygenation greatly enhances the aerobic activities of the beneficial microorganisms within the bio-film, which enhances the predation of the pathogens and also accelerates the de-nitrification process to remove harmful nitrates from water.

Thus what is needed is a low cost, low maintenance, chemical free and environmental friendly pretreatment means which possess desired pretreatment requirements and does not require extensive space for said pretreatment. Additionally, there is a need to combine the powerful selective VOC removal capability of the air stripping with the nonselective VOC predation capability of bio filtering.

SUMMARY OF INVENTION

Briefly, the disclosure relates to a liquid filtration device comprising: filter modules, wherein each of the filter modules has a layer for a bio-film and a first group of particles; and a biobridge, wherein the biobridge is coupled to the filter modules, wherein an input liquid is disposed on the filter modules, and wherein for each of the filter modules the input liquid is filtered by passing through the respective layer and the respective first group of particles.

DESCRIPTION OF THE DRAWINGS

The foregoing and other aspects of the disclosure can be better understood from the following detailed description of the embodiments when taken in conjunction with the accompanying drawings.

DETAILED DESCRIPTION OF THE EMBODIMENTS

Figure 1:
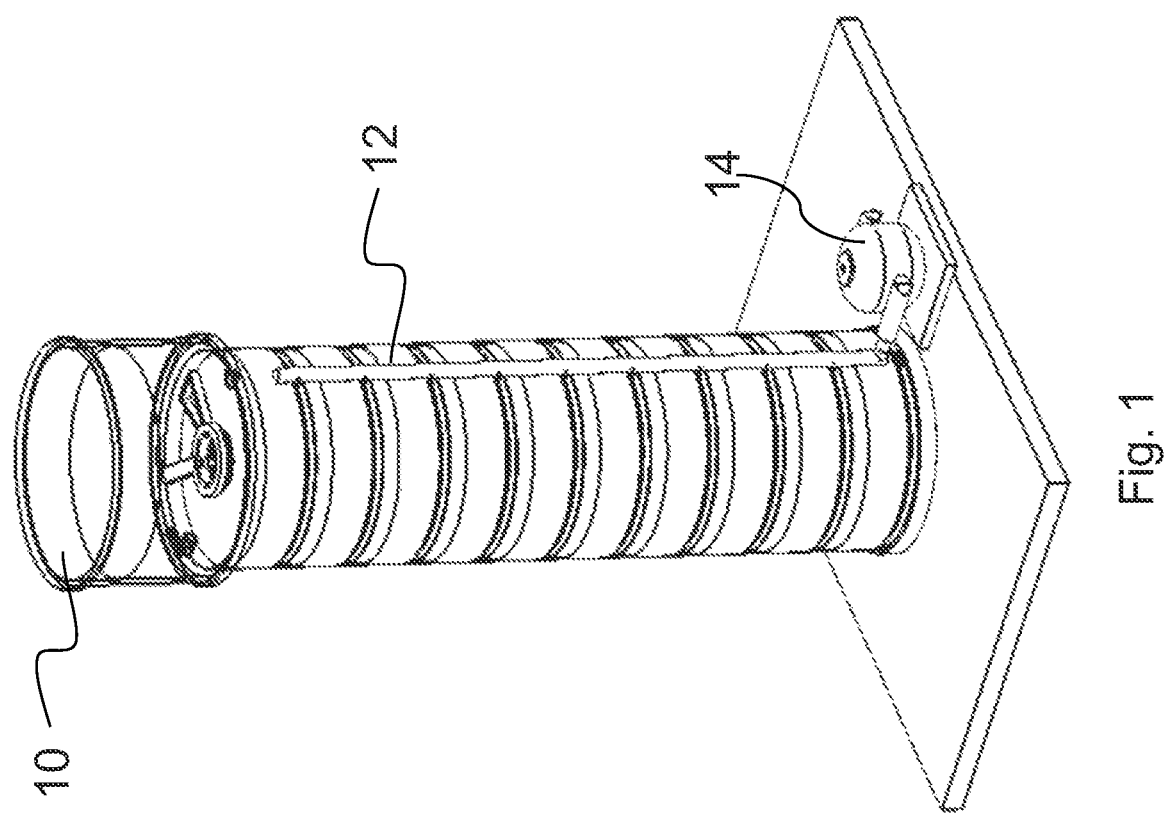
FIG. 1 illustrates a diagram of a water treatment apparatus from a posterior view.

In the following detailed description of the embodiments, reference is made to the accompanying drawings, which form a part hereof, and in which is shown by way of illustration of specific embodiments in which the disclosure may be practiced.

A first guiding principle of the disclosure can be related to the space optimization of the filtration apparatus by reducing the depth of the bio sand filtration layer to maintain the biological effects but decreasing the mechanical filtration effects by fine sands, decreasing the depth of the standing water to provide wetting of the bio film but removing the gravity feed aspect and replacing the latter aspect with a trickling water pump and a small input water buffer storage to pressurize the input water stream, and to shape the lower cavity to reduce its volume to a minimum while still providing the attributes needed to distribute the compressed air evenly without disturbing the uniformity of the water flow within the sand layer. Owing to the low specific water filtration rate (water flow rate per unit filtration area) of 0.1 gal/min/sq. ft. or less and the relatively low pressure head of less than 0.1 bar or less, a small polymer diaphragm water pump would suffice as a replacement of the gravity feed mechanism. By keeping the effective filtration area the same while drastically reducing the depth, the net surface to volume ratio increases, resulting in a size efficient design. The tradeoff is the reduction of the mechanical filtration capacity of the resulting apparatus. Since the efficiency of the fine sand filtration without the benefits offered by the biological (e.g., Schmutzdecke) filtration, is much lower than those offered by simple screen filtration devices, and since the need for mechanical filtration is much lower when the filtration apparatus is employed as a pretreatment filter for a main water purification system. Schmutzdecke operates by converting microscopic organic matters into inorganic salts. The inorganic salts so formed are typically trapped within the sticky and slimy Schmutzdecke but can also migrate downstream and are trapped or adsorbed mechanically.

Even a relatively shallow fine sand layer of 5 cm to 6 cm can effectively remove nearly all the larger particulates, the only advantage a deeper sand layer has is the filtration of smaller suspended solids since the drift motions for particles with diameters lower than the effective pore size of the sand bed can be retarded by the sands as they transfer their forward momentum to the sands when they travel through layer of sands. A 1 m deep sand bed with an average grain size of 0.2 mm has an equivalent pore size of about one micron because of the frictional drag experienced by the sub-sized particles resulting from the momentum transfer. Owing to the long filtration depth, the sand filter is far less effective and energy efficient as, say, a thin screen filter having a mesh size of 1 micron. The lower filtration efficiency rests primarily on the retarding nature of the filtration of the sand filter, versus the blocking nature of the screen filter.

Figure 4:
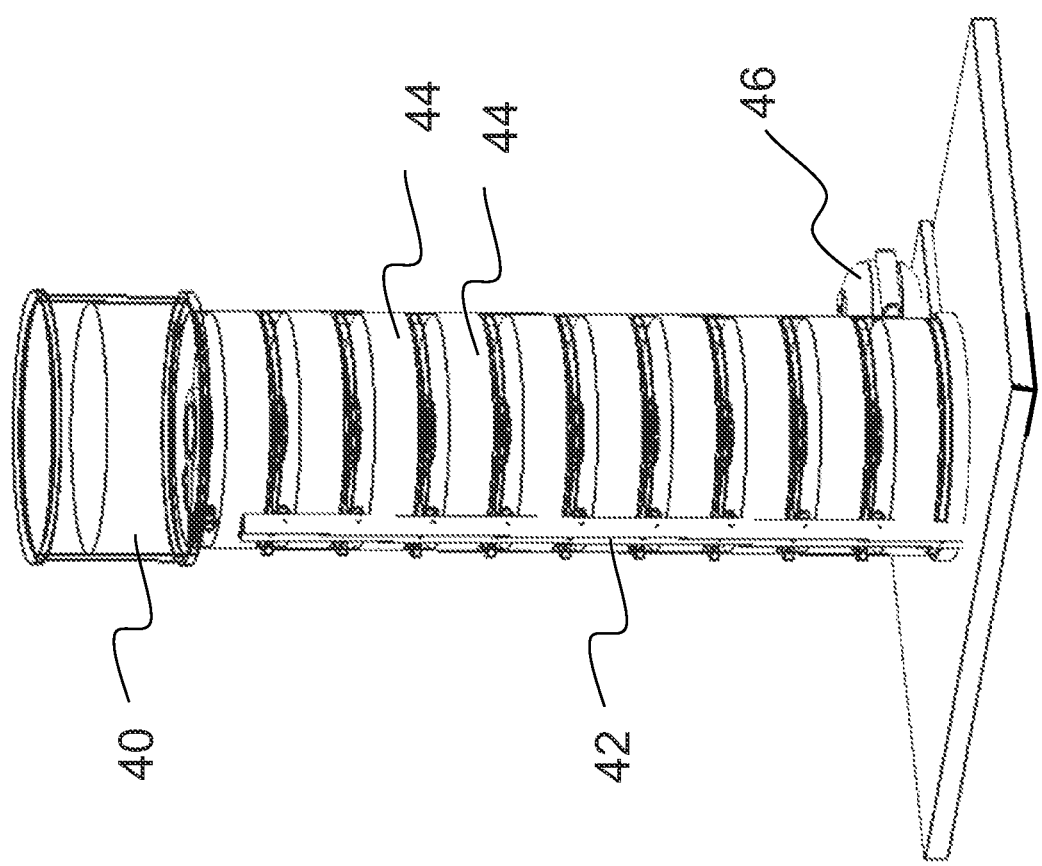
FIG. 4 illustrates a water treatment apparatus.

The advantage of utilizing a shallow sand filtration layer is readily apparent. As shown in FIG. 1, by stacking a multitude of such shallow sand filters vertically, the total water filtration rate can increase dramatically. For example, instead of a single 1 m tall bio sand filtration device, ten 5-cm to 10-cm high shallow sand filter modules (as shown in FIG. 4) can be stacked to provide ten times the filtration rate. Any number of filter modules n are therefore stackable to produce an n increase in the filtration rate due to the vertical and serial support structure of the disclosed ports and pipes. An input water storage 10 can be stacked on top of the device, wherein an air compressor 14 can aid in the filtering. Although the stacked shallow sand filter does not provide the strong mechanical sediment filtration as a similar sized bio sand filter, it would be more than sufficient as a pretreatment filter. It can also be used as a lower quality potable water filtration device when used in conjunction with an efficient screen filter or other traditional sediment filters and perhaps a disinfector.

A second guiding principle of the disclosure lies in the enhanced and complementary nature of volatile gases removal by air stripping or aeration versus bio stripping by Schmutzdecke. This is provided for by employing a Henry's law liquid-air transfer process enabled by feeding compressed air from the air compressor 14 via an air intake 12 from below the sand filtration layer to percolate the air up the wet saturated sand filtration layer to dislodge dissolved VOCs through the transfer action. The added benefit of the forced air percolation, or sparging, is the oxygenation of the sand filtration layer, which permits the beneficial microorganisms to flourish outside of the Schmutzdecke, which promotes aerobic predation of organic contaminants in the bulk of the sand bed. Additional benefits of oxygenation are the oxidation of dissolved irons and hydrogen sulfide, which turn them into ferrous irons and elemental sulfurs, which precipitate and trapped or adsorbed by fine sands. As the compressed air must percolate through the wet sand filtration layer, the sand layer must be sufficiently thin to reduce the required pressure head for the compressed air.

The aeration and oxygenation processes enhanced by aeration can also remove manganese, methane, and carbon dioxide. The removal of carbon dioxide is primarily accomplished by the swirling, turbulent motions generated when sparging is taking place. The turbulence creates scrubbing action which physically transfers the dissolved carbon dioxide to surrounding air bubbles, even though carbon dioxide is extremely soluble in water, and hence having a very small Henry's law coefficient, which normally does not favor such transfer. Hydrogen sulfide can also be removed from water by the turbulent scrubbing action in addition to the oxidation mechanism mentioned above.

The effectiveness of aeration is further enhanced by the counter-stream flows between the air and the trickling water within the sand media which drastically increases the interaction time between the input water and the rising air bubbles. Some minor channeling of the sand media by the rising air bubbles can take place since the rising air exerts a mild lifting force on the top semi-permeable membrane to increase the enclosed volume to permit such channels to be formed. This kind of channeling has little effect on the efficiency of the sand filtration processes since the downward flowing input water would not be able to use such channels to get around the sand media. Instead, these channels introduce additional interfaces between air and water, which would encourage the formation and growth of extra Schmutzdecke zones below the main Schmutzdecke zone, which further improves biological filtration. The increased air-water interface surface area further aids Henry's law VOC transfer.

A third guiding principle of the disclosure focuses on the implementation of self-cleaning features in the liquid filtration apparatus. Traditional slow sand filters can't be backwashed since the fine grained sands are not confined and valuable sands can be lost in large quantity during intensive backwashing. By encasing the filtering sands within a water permeable hydrophobic thin polymer membrane, and elastic spacers or frame within the enclosure, a shape can be maintained under normal operation condition to maximize the effectiveness of filtration. By making the enclosed volume at most a few percent higher than the minimum packing volume of the encased and compacted sands, there is little room for the sand bed to expand owing to the relatively high gravity forces acting on the sands. The very tight clearance of the semi-permeable enclosure makes it hard for channeling to take place. Channeling is a process resulting from the natural tendency of the water to follow the least resistance path and cutting permanent channels through sands over time. Since channeling permits the water to flow around rather than through sands, it greatly reduces the effectiveness of the sand filtration. When the flow of the liquid is reversed, however, the backward pressure of the fluid flow tends to lift the sand bed against the thin polymer membrane and force the membrane envelop to detach from the chamber sidewall to create an upper bulge. This expands the enclosed volume of the membrane enclosure, which allows the sand bed to expand as well as providing extra room for the sand fluid mixture to be mixed and stirred by the turbulent motion of the backwashing fluid flow.

The hydrophobic enclosure makes it hard for free standing shallow water to trickle through the mesh openings of the top surface as the water needs enough pressure to overcome the surface tension for the penetration to occur. Under pump pressure head, the raw input water would spread over the entire top surface which ensures near uniform filtration. The hydrophobic membrane enclosure reduces the probability of scaling. A common polymer membrane material suited for this purpose is the geotextile. Commercial and industrial geotextiles have maximum fabric opening spec as small as 0.035 mm. Smaller pore openings for the membrane require larger pressure head to push the water through it, which drives up the energy cost. However, smaller pore size slightly improves the mechanical filtering capabilities of the encased sands.

To facilitate backwash, the direction of the water flow must be reversed. This is accomplished by incorporating a reversing valve and by adding a storage buffer tank for the treated water. The backwashing liquid is taken from the stored pre-treated water and the waste water generated by backwashing which contains the inorganic salts and trapped solids which may have silt, brine, manganese, arsenic and sludge, should be deposed of and should not be reintroduced into the input liquid stream since the sand filter would not be able to further process them other than to trap them again, thereby destroying the original purpose of backwashing. The waste water can be dumped into a brine tank when the brine concentration exceeds a certain threshold.

An exemplary backwashing operation starts by first draining the water within the sand filter to the point that it barely covers the top surface of the filter bed. The water level should never be allowed to drop below the Schmutzdecke surface since by doing so would cause the bacteria to die out; secondly by blowing compressed air at a pressure head which is at least 2 times higher than during normal pretreatment operation. The compressed air forcibly percolates through the wet sand bed causing the sand bed to expand, thereby tearing and breaking up the highly compacted filtration bed and shattering the hard, brittle inorganic salts accumulated within Schmutzdecke, forcing the debris into suspension within the turbid liquid. Thirdly, the air blasting cycle is followed by the liquid backwash cycle wherein a portion of the treated water from the output water storage is forced upward, reversing its normal flow direction, through the media bed to continue the expansion and carrying the suspended colloids and a portion of the shattered Schmutzdecke into the upper cavity. Fourthly, ultrasound and/or other agitation means are introduced simultaneously to further breakdown the hardened Schmutzdecke and the media bed to force the remaining debris into the upper cavity by the backwashing liquid. Fifthly, the rinse cycle is performed, where the cleaner treated water flows continuously.

To help clean the sand filter, the backwashing water can be pulsed. When the water is stopped suddenly, the water within the pipe reverses its direction briefly due to the slow response time of the check valves. The sudden stoppage of the reversed flow causes a large buildup of negative water pressure which in turns generates a large acoustic shock wave throughout the plumbing network known as water hammering. Water hammering greatly disturbs the sands and the pulsating sound wave has a strong cleansing effect on the fine sands. Since the loud sound of water hammering might be annoying in a residential environment, faster check valves may be needed to reduce water hammering to an acceptable level. Alternatively, ultrasound transducers can be deployed near to or inside the membrane enclosure to perform ultrasound cleaning of the filtration sands. Ultrasound is inaudible to human beings hence it is more acceptable in residential environment.

Figure 6:
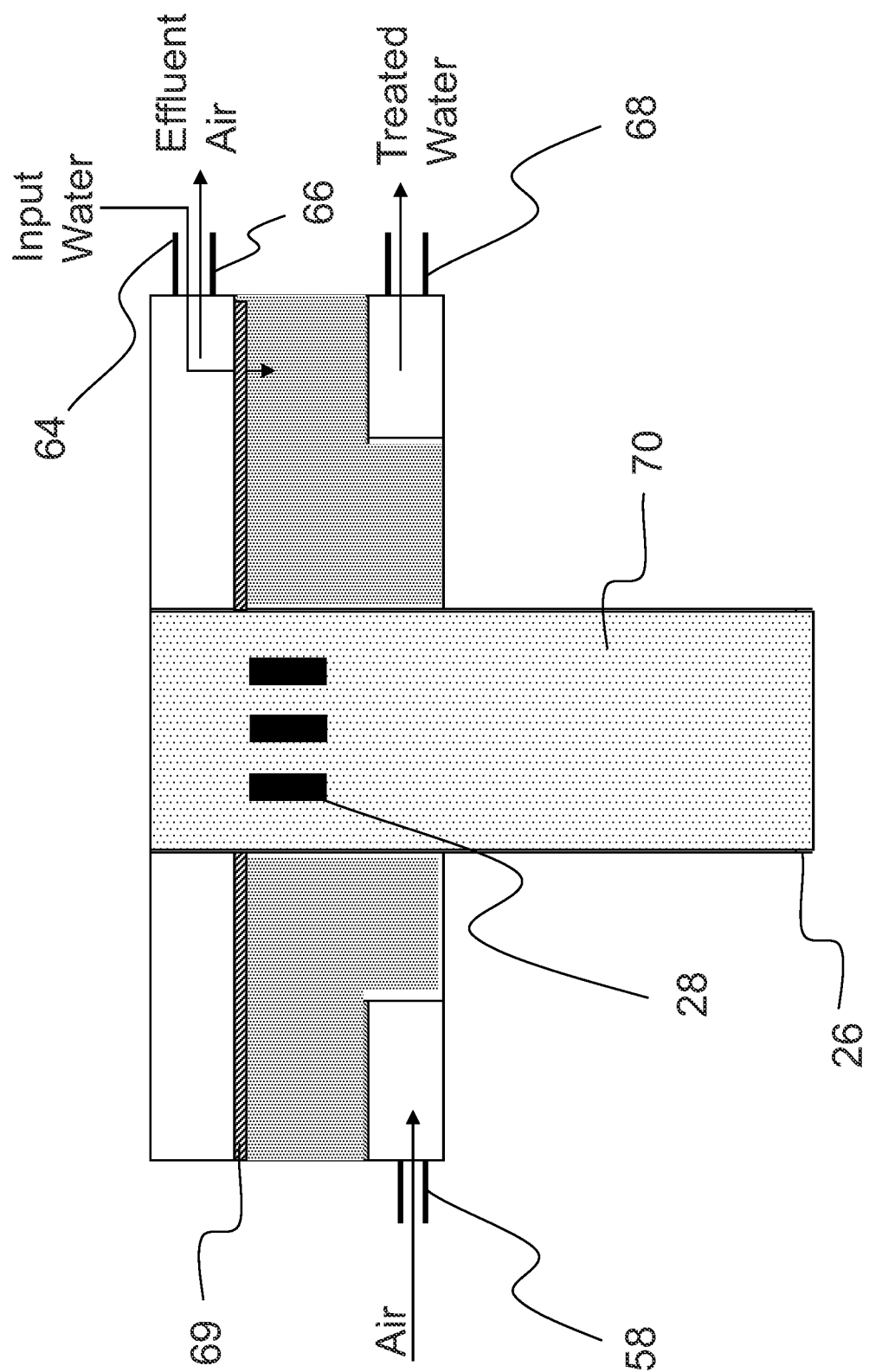
FIG. 6 illustrates a cross section of a single sand media module with a biobridge.
Figure 8:
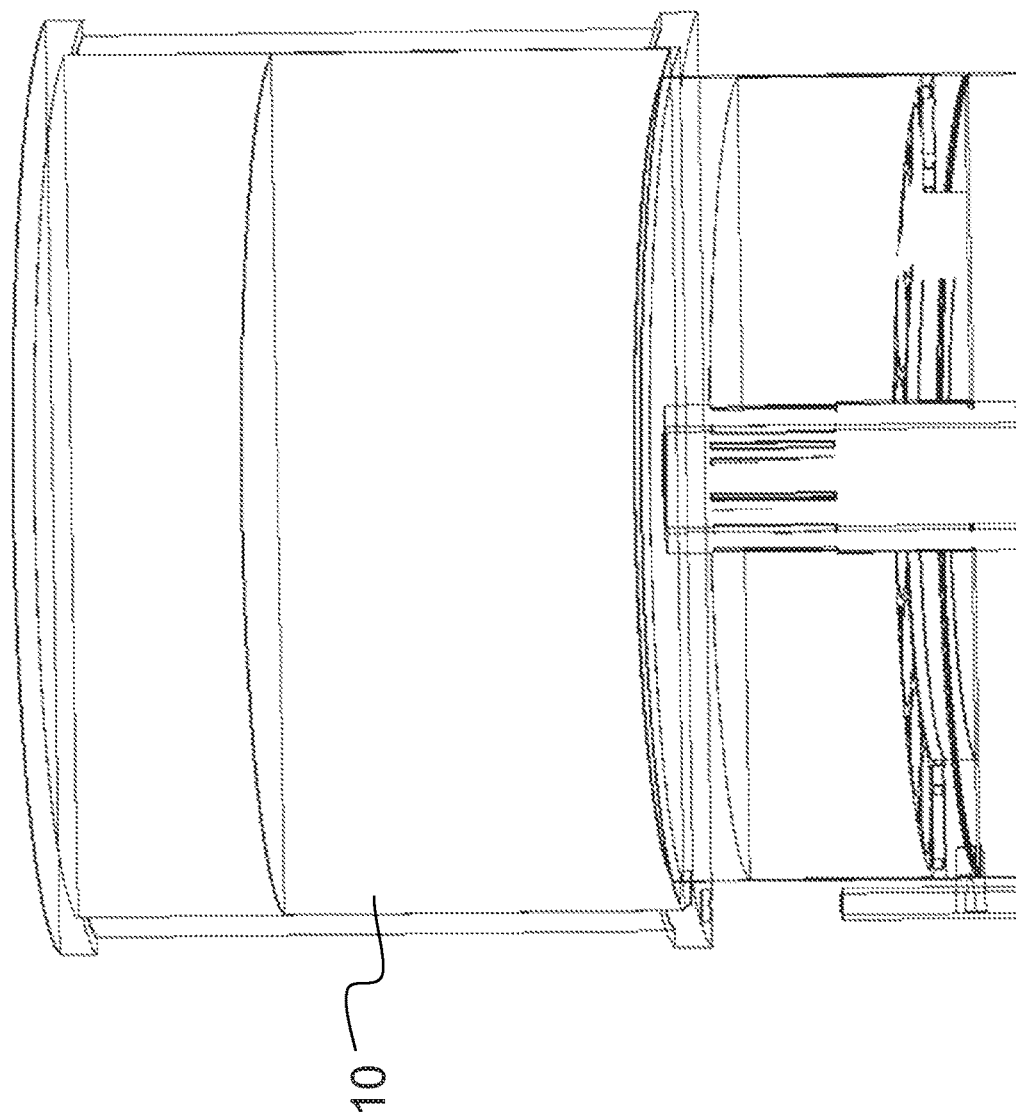
FIG. 8 illustrates a cross section of a sand media module with an input water storage and a biobridge.

Another consideration is the stability of Schmutzdecke. Schmutzdecke needs water and requires a steady diet of organic pathogens and plenty of oxygen to flourish, hence it would only exist near the water-sand or sand-air interfaces where all three components are present. Also, a single small Schmutzdecke community can die off easily owing to the changing external environment. To improve the stability of the Schmutzdecke formation, different Schmutzdecke communities need to be interconnected to permit the migration of active Schmutzdecke microorganisms to dying communities to revive them. This can be accomplished by building a common media bridge (e.g., a biobridge) which comprises a semi-permeable polymer membrane encased biobridge (as shown in FIGS. 6 and 8) and has a packed media (e.g., a group of particles) within the encasement. The particles of the biobridge can be coarse sands, gravels, random plastic scraps, and/or other particles/media. The biobridge can be infused with compressed air and input water trickling down from the sand filtration blocks. Although the packed media bridge(s) does little filtration, it enable the migration of bacterial organisms as well as the formation of patches of Schmutzdecke.

Although no exchange of sand particles are possible as they are unable to permeate the membrane, it is relatively easy for beneficial microbes to move from one Schmutzdecke colony to another. More importantly, the biobridge must be able to support bio-activities to permit the establishment of various signaling channels linking Schmutzdecke from different levels together. Such signaling channels enable the plankton bacteria to perform quorum sensing collective decision making process to evolve the bio communities. In effect, biobridge links the individual Schmutzdeckes into a unified bio country. Such packed media bridge takes up very little space but can go a long way toward stabilizing the bio film formation.

During normal filtration mode of operation, the compressed air and the trickling water interacts counter-streamwise, which is most efficient for air-water VOC transference. However, since the compressed air inlet and the effluence outlet are both located in the lower compartment, the cross flow from the compressed air port directly to the treated water outlet might reduce the air pressure and the air loss could also increase the energy cost for air compression. This can be alleviated by elevating the compressed air port above that of the water outlet and by having standing water always at the bottom of the lower cavity with water depth large enough to cover the water outlet completely. However, cross flow is still possible with higher compression pressure, or when the water level in the lower cavity drops. An alternative implementation is to employ check valves on the lower cavity ports for each chamber. The incorporation of check valves does not affect the normal operation provided the check valve for the water outlet is reversed and is in open position when the pressure is negative or slightly positive. This ensures that the liquid check valve remains open whenever the air pressure differential (between inside and outside air) is below a certain threshold. Under moderate to strong compressed air pressure, the water outlet port is closed to prevent the leakage of compressed air through cross flow. The compressed air is fed into the lower cavity intermittently in pulsed manner. At sufficiently high pulse rates (e.g., a few Hz to tens of Hz), the output water flow rate is approximately constant since the air cavity and the output storage buffer act as a low pass filter.

The backwashing of the filter sands can be automated by the employment of a sensor array and digitally controllable reversing valves. The sensors can provide information about the water and air flow rates and turbidity of the input water, as well as the hydraulic pressure differential between the inlet and outlet water ports. When a clogged condition is detected by observing the increased back pressure and reduced water and/or air flow rates, the backwash can be scheduled automatically. The increased turbidity of the output water can also be considered to be a precursor of the impending water blockage and can be used to schedule backwash at the earliest available date.

FIG. 1 illustrates a diagram of a water treatment apparatus from a posterior view. A liquid filtration device (e.g., a water treatment apparatus) can comprise the input water storage 10 and a tower of stacked filter modules coupled to the air intake 12 and the air compressor 14. The air intake 12 can be coupled to the filter modules.

Figure 2:
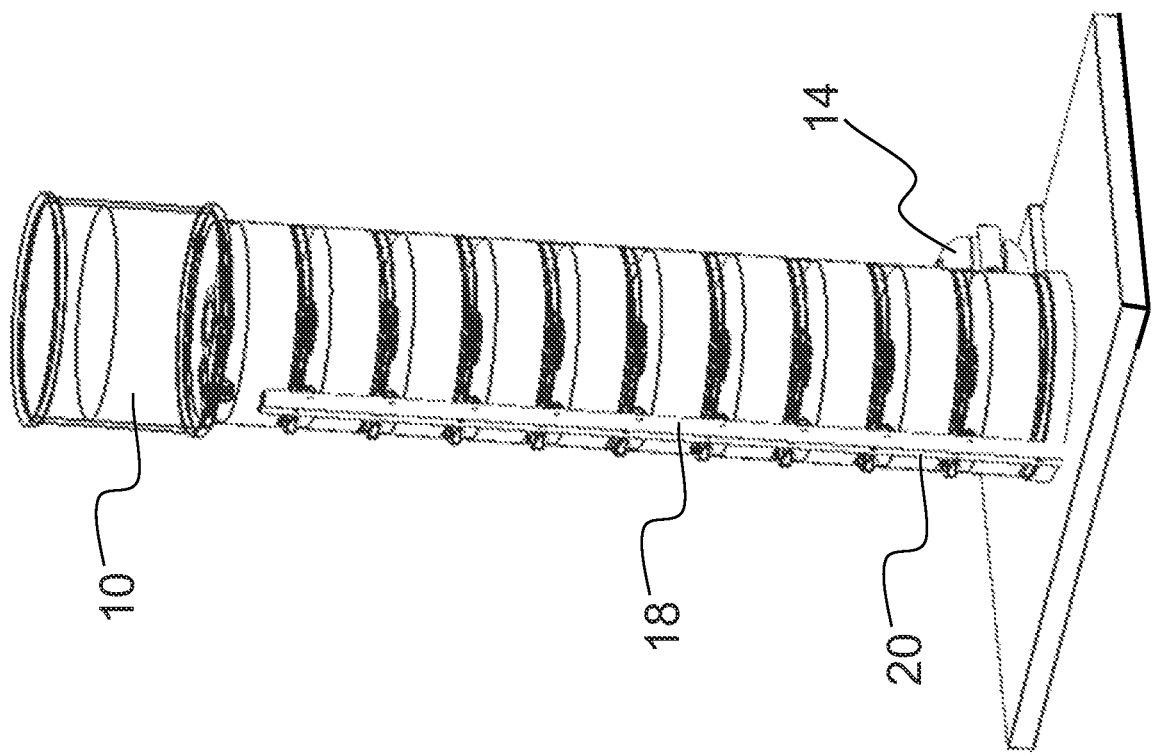
FIG. 2 illustrates a diagram of a water treatment apparatus from an anterior view.

FIG. 2 illustrates a diagram of a water treatment apparatus from an anterior view. A liquid filtration device (e.g., a water treatment apparatus) can further comprise an input water storage 10, an input water/air exhaust channel 18, a treated water return channel 20, an air compressor 14, and filter modules (see FIG. 6).

The raw input water is fed into the input water storage 10 which provides both the buffering function for the often intermittent raw water input and maintains an undisturbed and unfiltered supernatant raw water of sufficient water height. The supernatant raw water from the storage 10 is in communication with said stacked filter modules in parallel through the input water/air exhaust pipe 18 and the respective pressure regulating input valve (not shown) for each individual filter module to ensure the constancy of the input water pressure level. The air compressor 14 pumps a slightly compressed air through the air intake 12 to the air intake ports of said stacked filter modules in parallel to force the outside air to percolate through the fine sand media of the individual filter module to provide aeration and the oxygenation of the water under treatment. The forced air aeration process removes much of the VOCs and nitrates which produce foul odors and are potentially toxic to human beings when present in high enough concentration from entering into the product water stream. The oxygenation process further benefits the biological filtration by enhancing aerobic predation of the Schmutzdecke and by extending the effective zone of Schmutzdecke further down into the nutrient-depleted region below the main Schmutzdecke layer. The treated (product) water can be collected by the treated water return channel 20 to an output water storage tank (not shown) for intermittent consumption of the potable product water. The gaseous VOCs extracted by the aeration process is scavenged and expelled by the forced compressed air through the air exhaust ports of the individual filter module and is vented through the common air exhaust channel 18.

Figure 3:
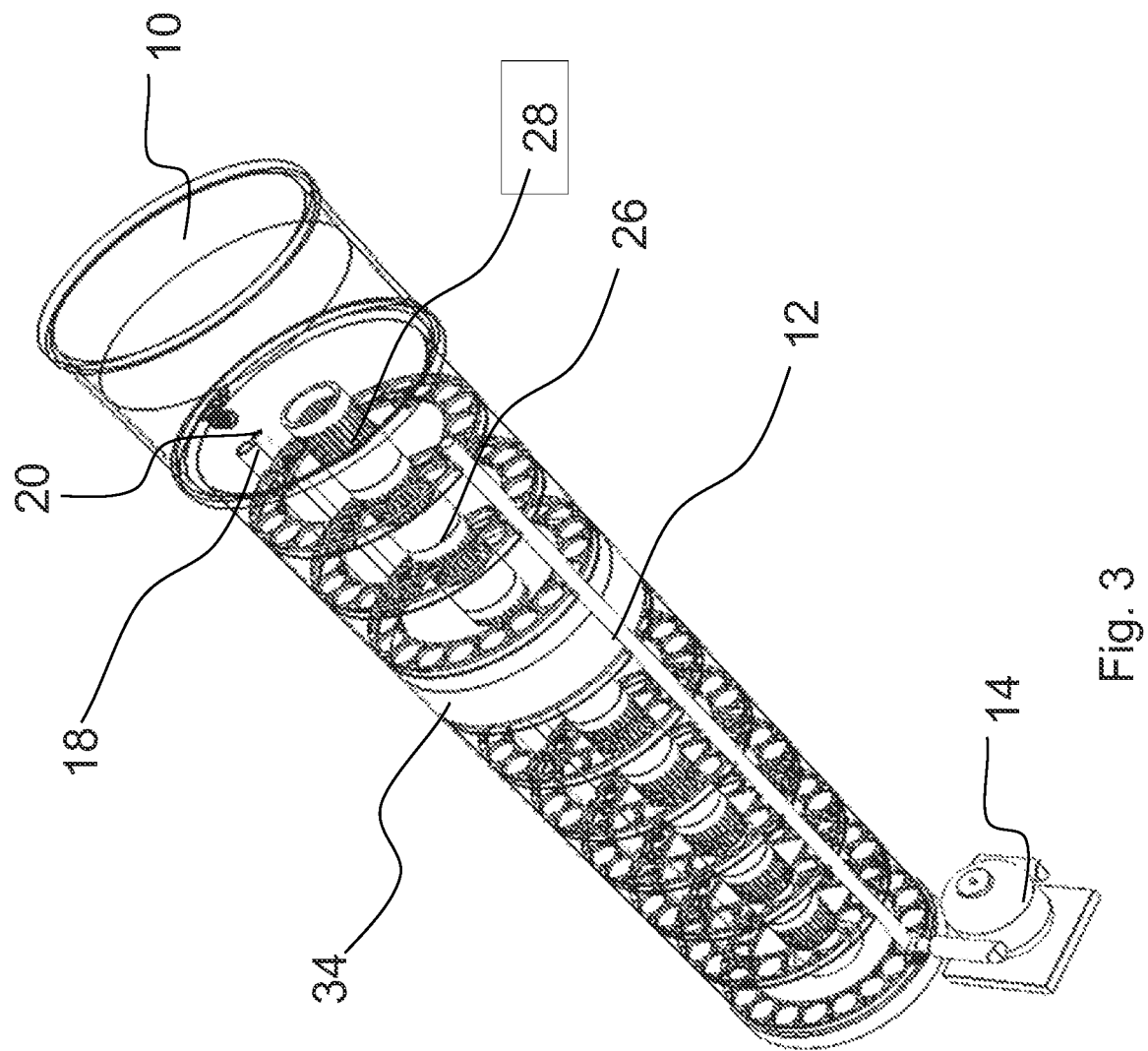
FIG. 3 illustrates a diagram of a water treatment apparatus depicting various components.

FIG. 3 illustrates a skeletal diagram of a water treatment apparatus depicting various components. A liquid filtration device (e.g., a water treatment apparatus) can comprise an input water storage 10, a center post 26, inlet slits 28 for connection to a biobridge, an input water/air exhaust channel 18, a treated water return channel 20, sand filter modules 34, an air intake channel 12, and an air compressor 14.

The center post 26 provides the housing to loosely packed media and is in communication with the untreated input supernatant water of all the sand filter modules 34 through strategically placed inlet slits perforating the center post wall, permitting the raw water and exhaust air to enter into the packed media. The said loosely packed media, once imbued with oxygen and VOC rich exhaust air and nutrient-rich raw input water, can provide a thriving but sparse community of biological microorganisms, which together form the biobridge. The biobridge serves to bridge all the Schmutzdecke layers within each bio filtration module 34 to provide enhanced biodiversity by establishing a dispersion pathway between any two filter modules so that the micro-organisms such as plantonic bacteria, fungi, protozoa, etc. from one Schmutzdecke community can migrate to the other Schmutzdecke community. Such enhanced biodiversity can prevent the mass extinction of one Schmutzdecke which is a frequent occurrence when said Schmutzdecke exists in complete isolation. Biobridge can also be pre-seeded with needed biological materials during startup to drastically reduce the nominal 20 day period required for the establishment of Schmutadecke within each fresh filter module.

FIG. 4 illustrates an exterior view of a water treatment apparatus. A liquid filtration device (e.g., a water treatment apparatus) can comprise an input water storage 40, an air intake channel 42, sand filter modules 44, and an air compressor 46.

Figure 5:
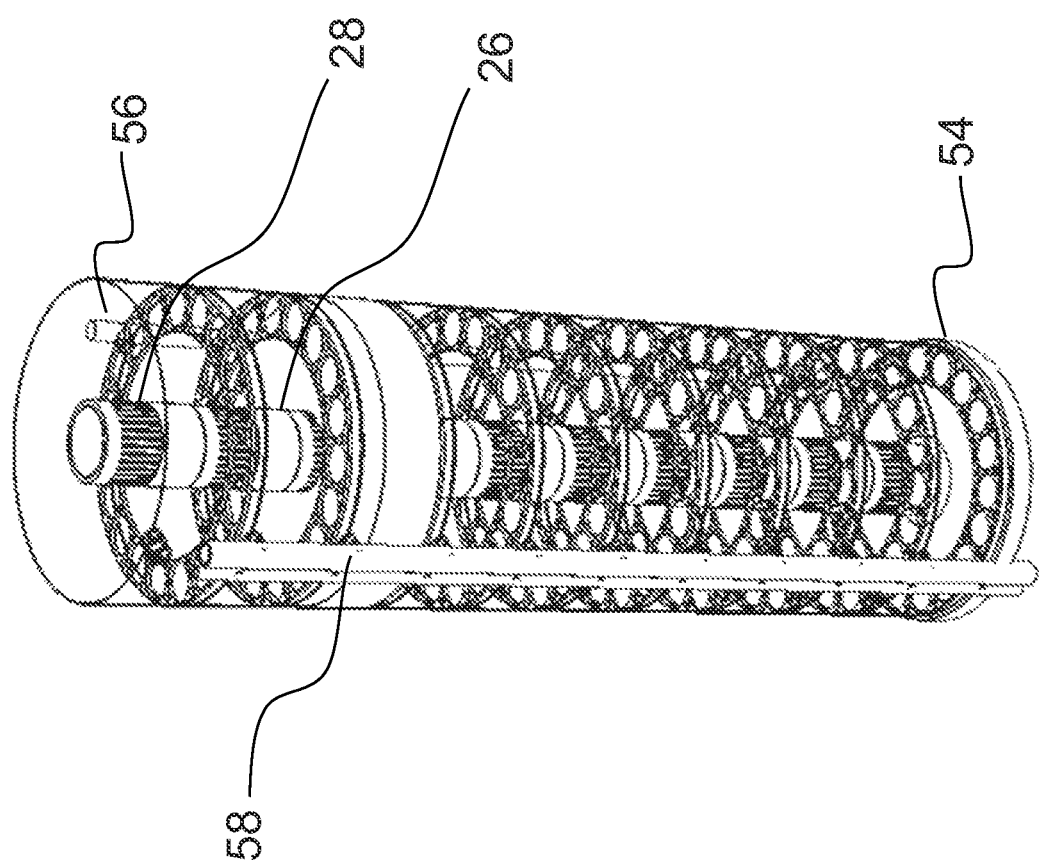
FIG. 5 illustrates a wire-frame view of a water pretreatment apparatus.

FIG. 5 illustrates a wire-frame view of a water pretreatment apparatus. A liquid filtration device (e.g., a water treatment apparatus) can comprise an input water and air exhaust port 58, a center post 26, inlet slits 28 for connection to a biobridge, sand media support 54, and an air intake port 56.

In this skeletal view, air compressor 14, compressed air intake pipe 12, input water storage 10, input water/air exhaust channel 18, treated water return channel 20, have all been hidden to better illustrate the interior components of said water pretreatment apparatus. The air intake port 56 for the stacked filter modules is the entry port for the compressed air intake pipe 12 and is in communication with the outlet of the air compressor 14. The air exhaust port 58, situated near the top of the stack, is the outlet port of the air exhaust channel 18 and could possibly be utilized as the inlet port for the raw input water from the storage tank 10. Each filter module comprises a geotextile encased sand media pancake (not shown) which in turns is supported by the sand media support 54. The multitude of holes within each sand media support 54 evident in the drawing permit treated water to flow through to be collected at the bottom cavity (not shown) of each filter module. Care must be taken to ensure that the holes are small enough as to enable the sand media support 54 to adequately support the sand media pancake without noticeable deformation of the geotextile wrapping, but not so small as to significantly restrict and impede the flow of the treated water.

FIG. 6 illustrates a cross section of a single sand media module with a section of the biobridge. A filter module (e.g., a sand media module) comprise an air module intake port 61, a module input water port 64, a module effluent air port 66, and a module treated water port 68, and the sand media pancake 69. The biobridge 70, shown only a small section of it, is a separate entity apart from the filter module. It comprises the center post 26, the inlet slits 28, and loosely packed media 29. However, it would be possible to break up the biobridge into stackable sections so that the entire filter module could comprise both the sand media filter portion and the sectioned biobridge in a single modular package. Conceptually though, biobridge should be considered to be a common shared channel and each filter module is separate but in communication with the shared biodiversity channel.

Figure 7:
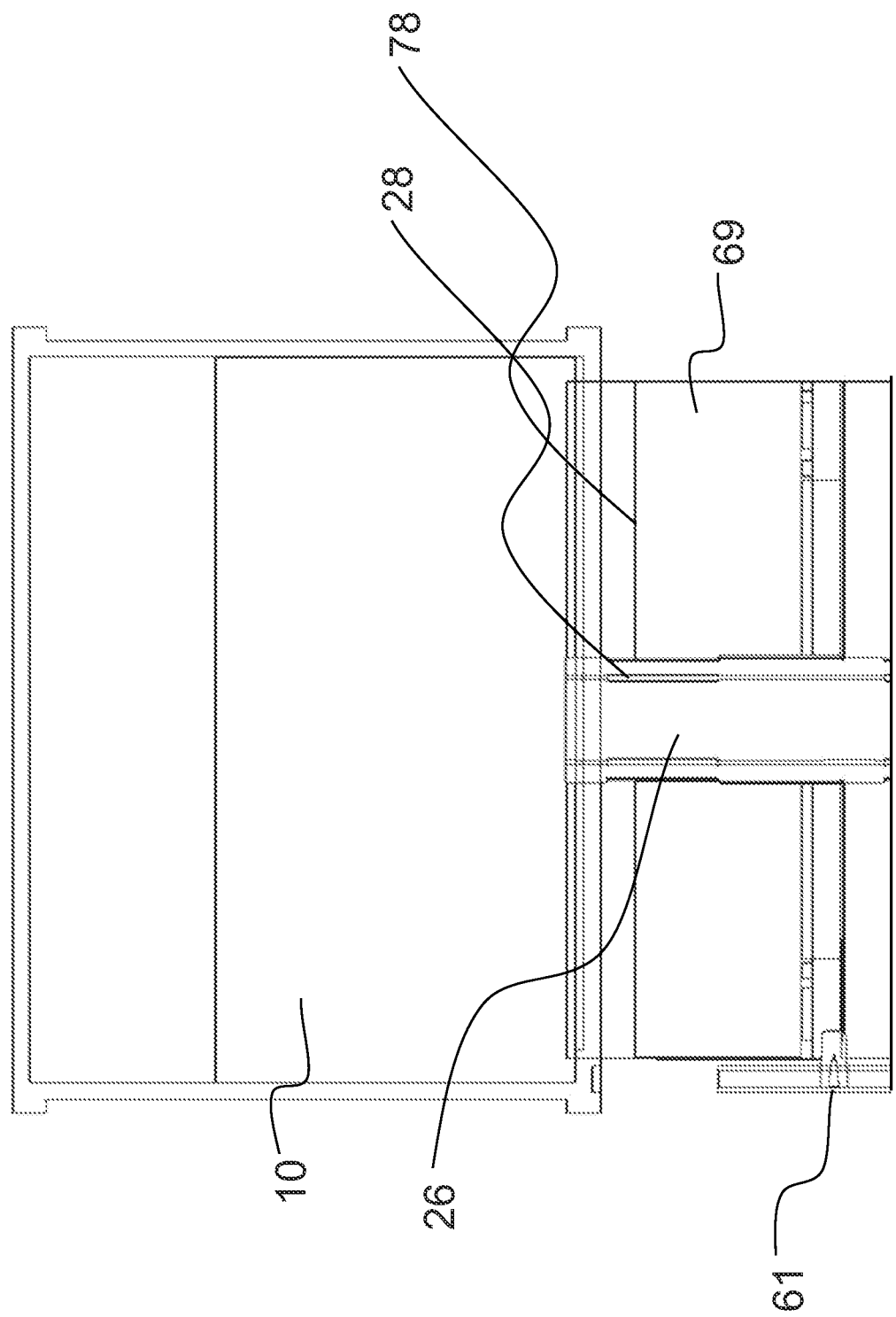
FIG. 7 illustrates a cross section of a sand media module with an input water storage.

FIG. 7 illustrates a cross section of a sand media module which is at the top of the filter module stack with an input water storage 10. An input water storage 10 can be connected to a single sand media module or a stack of filter modules through a common input water inlet channel 18. (Not shown since it is hidden from view). The sand media module comprising an air intake port 61, a center post 26, inlet slits 28 for connection to a biobridge, and sand media pancake 69. Once the bio-film (Schmutzdecke) 78 is fully formed, the slimy extracellular polymeric matrix (EPM) will provide an effective protective barrier to shield the participating microorganisms from harsh chemicals and drugs, while the gelatinous EPM matrix entraps foreign particulate matters and adsorbs dissolved organic materials and metabolized by bacteria, fungi, protozoa and other predator species. When a tiny foreign particulate matter which could itself be a microorganism first come into contact with the mucilaginous EPM surface, the sticky substance holds and restraints the movement of the particulate object but does not entrap it. Over a period of ten minutes or so, the inhabitants of the Schmutzdecke slowly secrete additional polymeric substance (primarily polysaccharides and proteins) to enwrap the foreign matter to completely trap it. This allows time for the inhabitants to predate and metabolize the foreign object through aerobic and anaerobic processes to thoroughly convert it into inorganic matters. Any undissolved/undigested inorganic matters are carried down by the slow trickling water deep into the depth of the sand media and are mechanically trapped between sand grains or are adsorbed by the mutual attraction between different undissolved particulates, or the sand grains. Living microorganisms which survived the predation by the hosts within the Schmutzdecke will escape or be carried down by the trickling input water into the bacteria's equivalent of Sahara desert, i.e., a zone below the biologically active region just underneath the Schmutzdecke layer where almost no nutrient and oxygenated water could be found. This leads to a starvation of the living organism whose carcass is also mechanically or adsorbed among the sand grains. Referring to FIGS. 6 and 7, raw input water is introduced to the top cavity of the filter module, just above the sand media pancake. Owing to the input water pressure regulation, the supernatant water level within the top filter module cavity is kept to a predefined height to ensure the water flow rate which should be of the order of 0.1 m/hour stays the same for all filter modules. The slow water filtration rate allows the predator microorganisms within the bio-film to remove organic matters and slow the downward migration of undissolved solids with the help of the gelatinous and highly viscous EPM substance. The biological and mechanical/chemical filtration processes produce a clean potable water further downstream, with substantial bacterial reduction. The compressed air entering from the air intake port 61 slowly forces its way upward through the compacted sand media. The large interface area between the down trickling input water and upward flowing compressed air causes the input water to be greatly aerated to rid the input water of VOCs and released nitrates from the anaerobic metabolism within the Schmutzdecke layer. The upward drifting compressed air also strongly oxygenates the input water to enhance the beneficial biological cleaning of the input water. The aerated and biologically cleansed water is collected at the bottom cavity and outputted through the treated water outlet port 68. The effluent air, now rich in VOCs and colloidally suspended microscopic solids, is vented through the effluent air port 66.

In an embodiment, the inlet slits can be placed to sit between the outer sand media module and the inner biobridge cavity, to serve as windows, or portals, between the bacteria within the sand media Schmutzdecke and the sparser biological colonies that exist within the biobridge to provide enhanced biodiversity. The semi-permeable geotextile wrapping prevents the sand media to drift through the slits and to isolate the varying pressure of the media within the biobridge from the individual sand media module.

FIG. 8 depicts another cross section view of FIG. 7 for a sand media module with an input water storage and a biobridge. The input water storage 10 is now depicted with filled supernatant input water, and the biobridge is now depicted with a filled loosely packed coarser sand grains. The coarser sand grains create larger interstitial spaces between the media grains to permit easier penetration of air and water and to allow freer movement of biological species inside the biobridge media volume.

Figure 9:
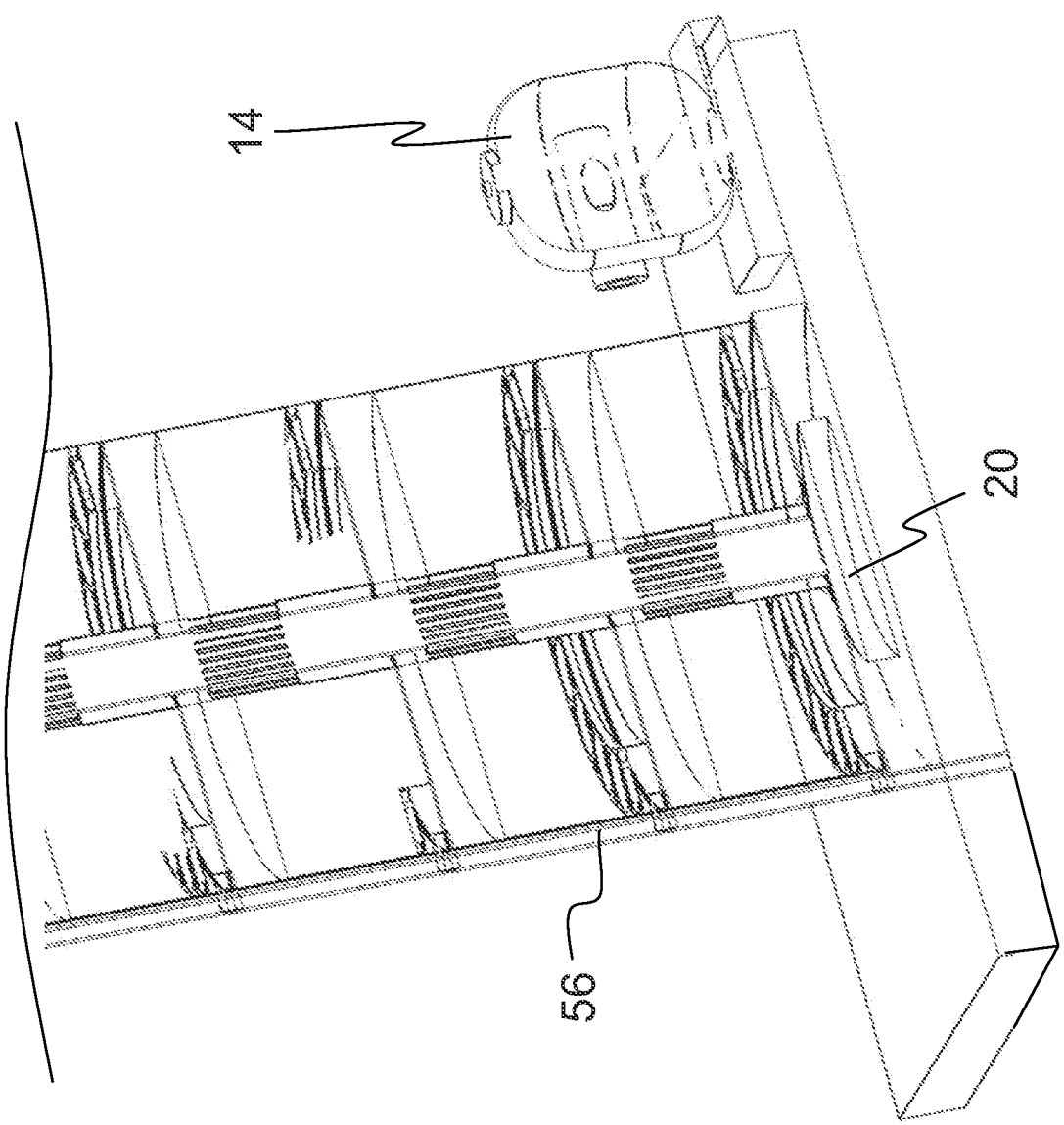
FIG. 9 illustrates a cross section of a sand media tower with a purified water tray.

FIG. 9 illustrates yet another cross section view of FIG. 7 for a sand media tower with an air compressor, with emphasis on the multi-stack nature of the media filtration modules and unified biobridge. Also depicted is an air compressor 14 to draw in ambient air and force the compressed air through air intake ports 56 of each media filter module in the sand media tower such that the purified water can be collected in a purified water tray 90 through a common treated water return channel 20.

Figure 10:
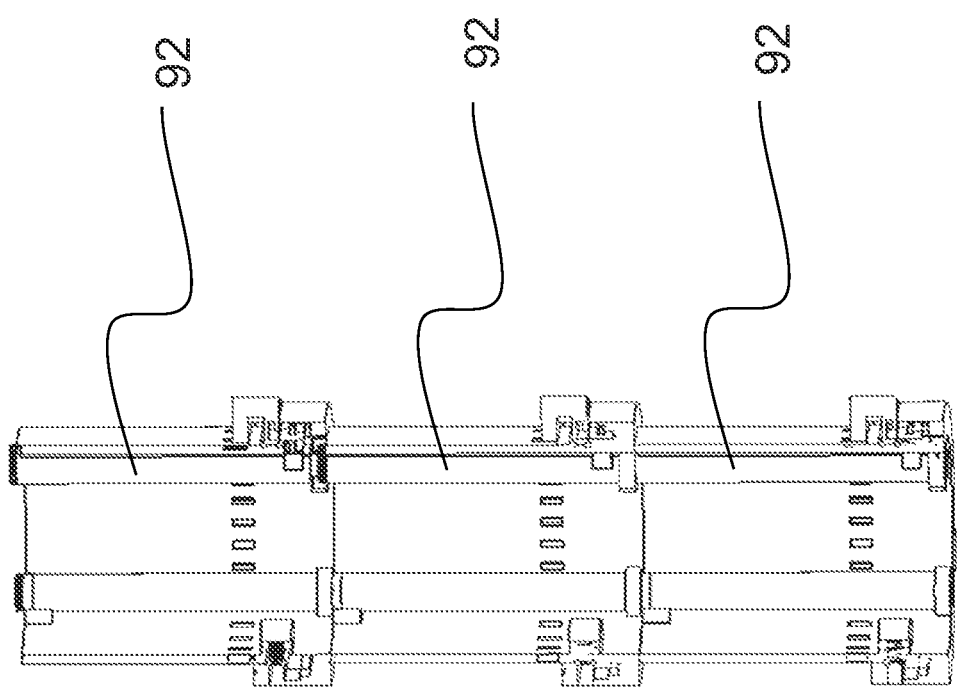
FIG. 10 illustrates a diagram of stackable biobridge modules.

FIG. 10 illustrates a diagram of an alternative preferred embodiment of stackable biobridge modules. In an alternate embodiment, the biobridge 94 stack can comprise stackable biobridge modules 92, where the biobridge modules 92 can be serially stacked one biobridge module on top of another biobridge module. Also contained within each biobridge module are sectioned common channels for input water inlets/effluent air outlets, treated water return, and even the common sealed conduit for motorized rotary shaft for driving the rotary skimmer arm within each filter module, to be discussed later. In this alternate embodiment, there is no need of external piping and axle shaft since everything is contained within the modular biobridge section module. Each of the internal common channel piping has an o-ring at one end and thread or o-ring groove at the other end in such a way that upon stacking one module on top of another, all the channels are aligned simultaneously and the junctions are sealed with o-rings. For critical piping such as that used for treated water return, some silicone caulking or hot melt glues might be needed to ensure perfect seals since any possible contamination of the treated water return pipe would assuredly defeated the whole purpose of water purification.

Figure 11:
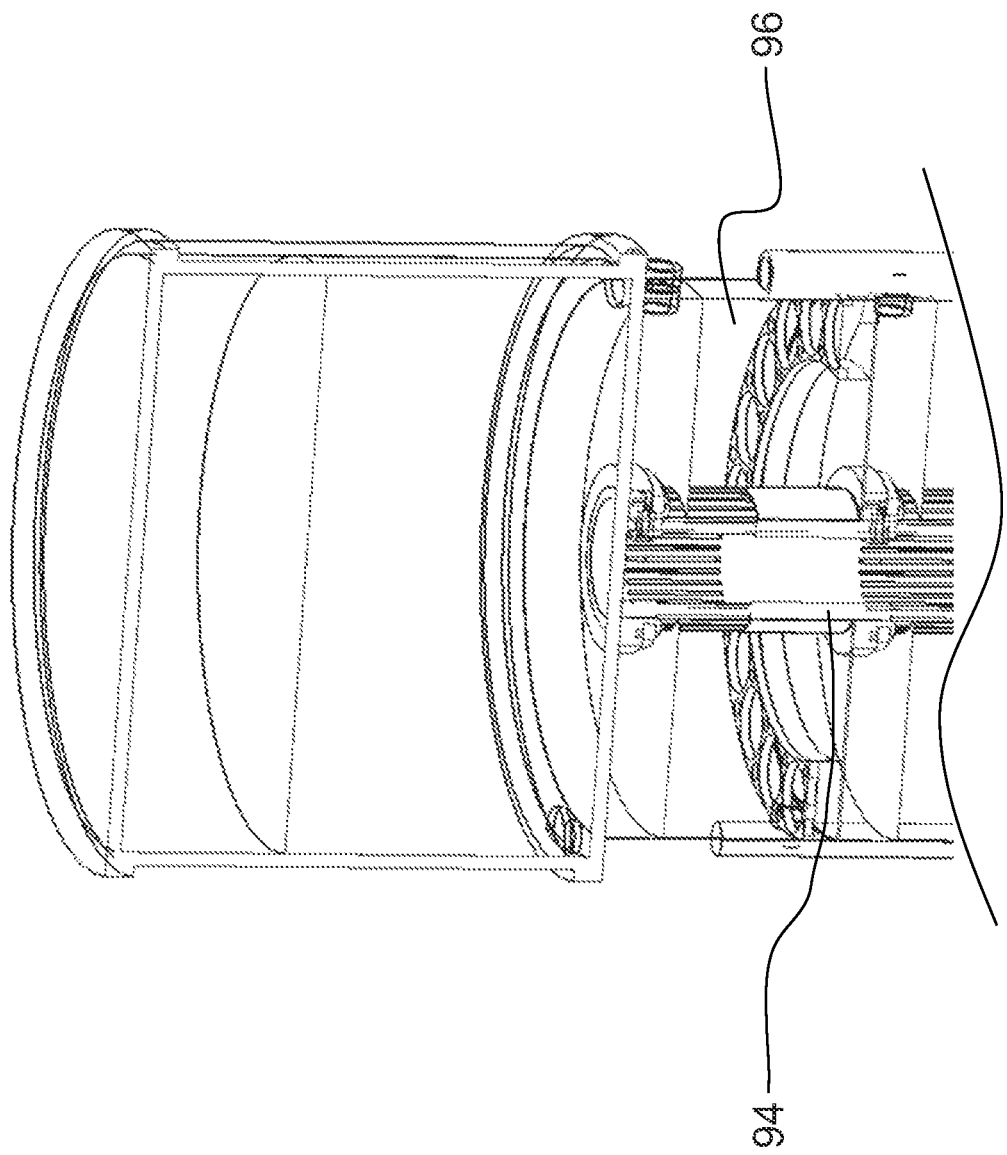
FIG. 11 illustrates a diagram of filter modules.

FIG. 11 illustrates a diagram of stackable filter modules. A biobridge 94, sand media filters 96 (or other filter modules) can be coupled and sealed by proper alignment of the internal sectional tubing together and with compression O-rings and grooves. In particular, the biobridge 94 can be connected to the sand media filters 96 via an axis that runs perpendicular to the sand media filters 96.

In an embodiment, a liquid filtration device comprises: serially stacked filter modules, wherein each of the filter modules has a layer for a bio-film and a first group of particles; and a biobridge, wherein the biobridge is coupled to the filter modules, wherein an input liquid is disposed on the filter modules, and wherein for each of the filter modules the input liquid is filtered by passing through the respective layer and the respective first group of particles.

The liquid filtration device can further comprise skimmers, where the skimmers are coupled to the filter modules. Furthermore, the skimmers are rotatable about an axis through the filter modules so that the skimmers can remove particles disposed on a top side of a bio-film the filter modules within a specific time period to prevent double trapping of the non-dissolved solid particulates. The constant skimming operation has the further benefit of continuous removal of non-dissolved disposed solids to prevent the accumulation of trapped/disposed solids deep down into the bulk of the sand media, thereby enhancing the filtration of sediments as well as prolonging the life of the sand media. Also, the skimmers can reduce the bio-film of the filter modules to a predefined height, with consequent benefit of preventing the aging and hardening of the EPM layer, making sand scrapping, harrowing, and resanding maintenance operations unnecessary.

The biobridge of the liquid filtration device can comprise a second group of particles, where the second group of particles is coarser than the first group of particles. The bio-films of the various filter modules can be connected to each other via the biobridge. Thereby, a select microorganism can be propagated from a certain one of the bio-films to one or more other ones of the bio-films via the biobridge. Additionally, the biobridge can be pre-seeded with a select microorganism, where the select microorganism can be propagated from the biobridge to the filter modules to populate the bio-films of the filter modules with the select microorganism.

The biobridge contains coarse sand media with a coarse grain size>1 mm in diameter. This allows the different bio-films from individual filter modules to communicate with one another through the exchange of signaling molecules, nutrients, oxygen, and/or other methods, and to permit the dispersion of bio-films throughout the depth of the coarse sand media. This helps to promote biodiversity, to ensure the persistence and stability of the bio-films, allowing themselves to repopulate each other.

The proliferation of any specific bacteria can be controlled by several applications of accurate environmental engineering. For example, maintaining a pH value to fall within a narrow range of parameters; controlling the temperature; and/or controlling the oxygenation rate (e.g., via a flow rate/compression ratio of the compressed air).

These and other applications can be used to promote and/or suppress specific strains of bacteria. This can also be applied to beneficial bacteria in treated waters when probiotics are desirable in the treated water. In essence, the user would be able to control/specify the particular strain of beneficial bacteria to be present in the treated water through "microprogramming."

Figure 12:
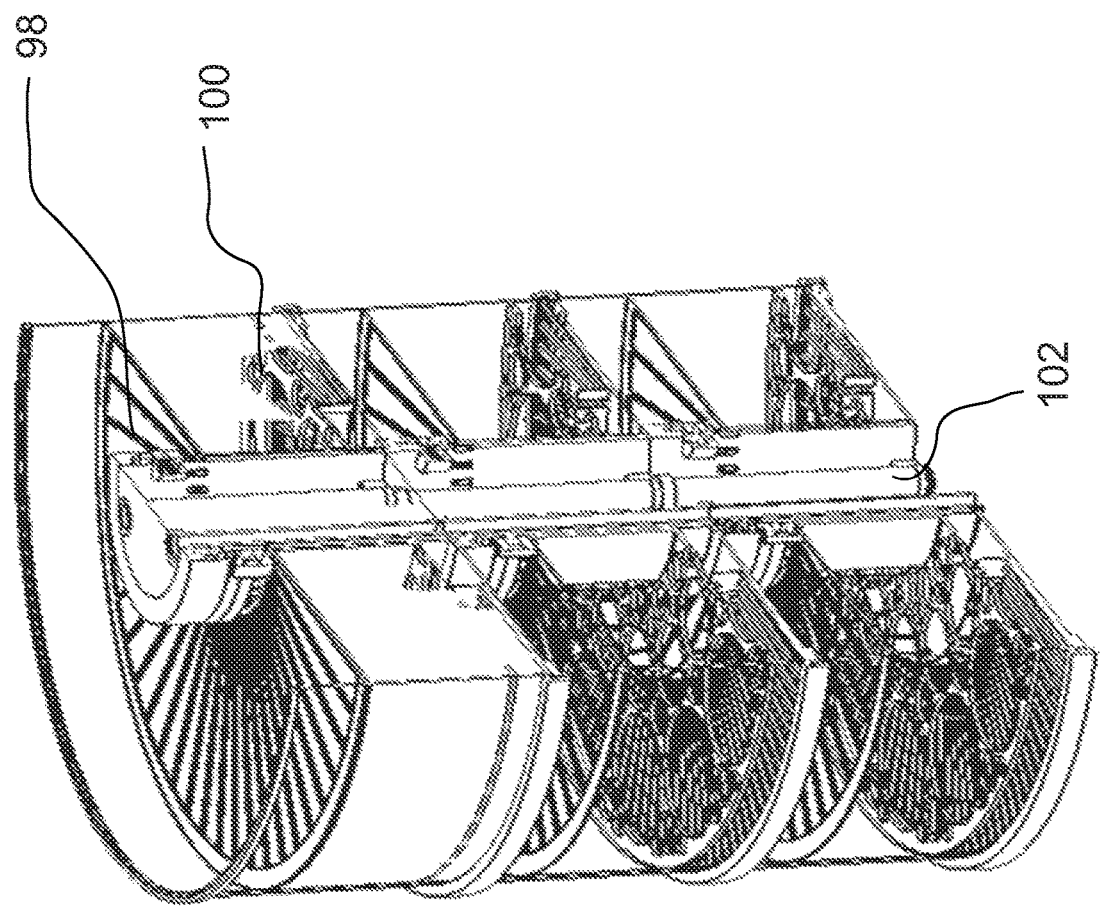
FIG. 12 illustrates a diagram of a cross sectional view of filter modules.

FIG. 12 illustrates a diagram of a cross sectional view of filter modules without the sand media. The filter modules can comprise a top spacer 98, a bottom spacer 100, and an air intake/treated water return channel 102. The bottom spacer 100 is similar to the sand media support 54 in FIG. 5. Its main function is to support the weight and the bottom shape of the sand media and to create a bottom cavity for the filter module to allow the treated water to be collected and to serve as the entrance chamber for the compressed air. The top spacer 98 serves multiple functions; it maintains the shape of the top sand media surface and to prevent the geotextile encasing the sand media to come into direct contact with the rotating skimmer arm while permitting unobstructed movements of the bacteria through the wide spacer windows, enabling Schmutzdecke to be formed both above and directly under the top sand media surface. The proper stacking of the filter and biobridge modules automatically interconnect the air intake/treated water return sections to form a common air intake/treated water return channel.

Figure 13:
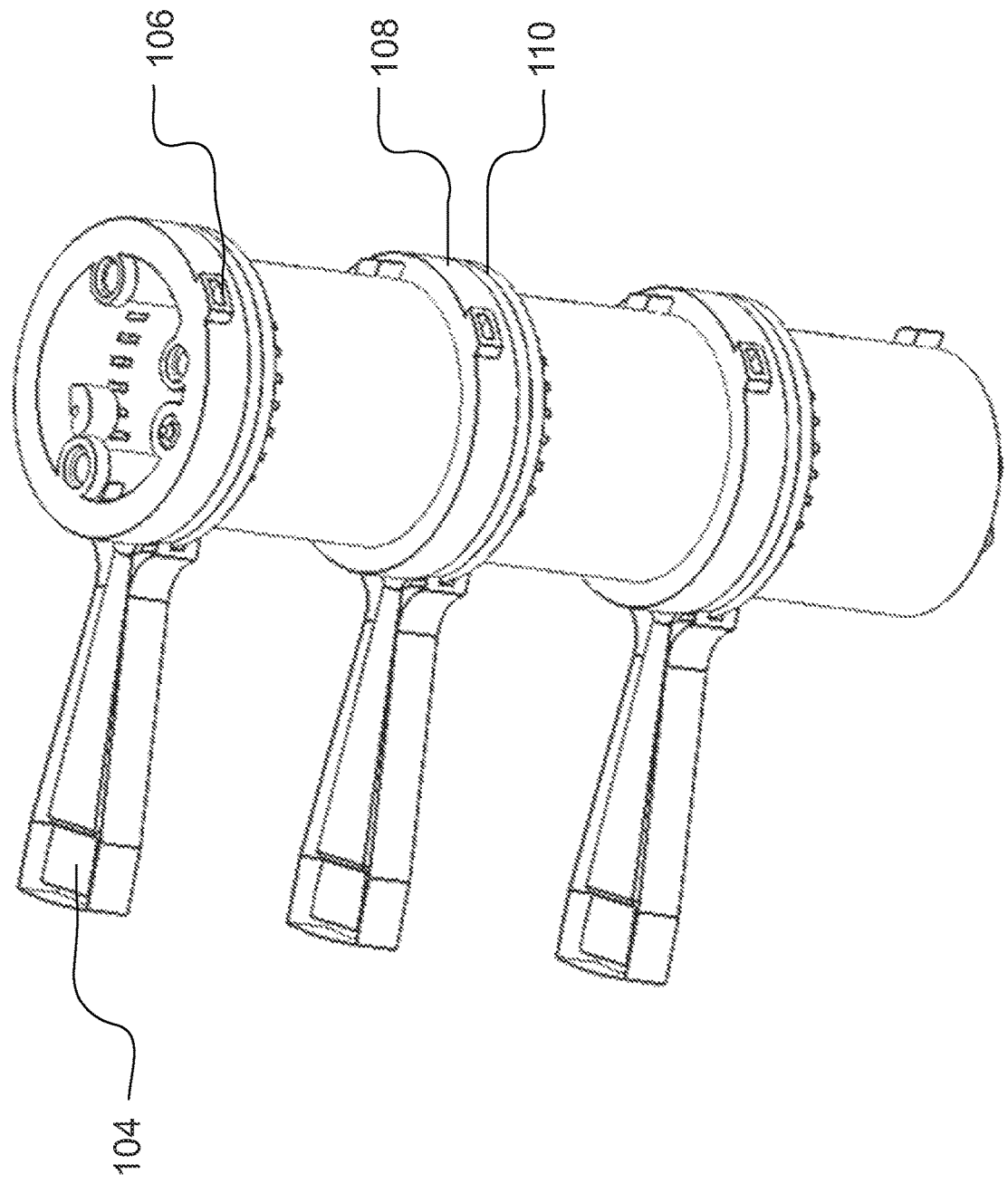
FIG. 13 illustrates a diagram of a stacked biobridge with skimmer arms.

FIG. 13 illustrates a diagram of a stacked biobridge with skimmer arms. A stacked bio bridge can have rotating skimmer arms 104 coupled to the biobridge. The rotating skimmers arms 104 can rotate about the biobridge using a rotor 106, an upper stator ring 108, and a lower stator ring 110. The main purpose of the skimmer arms 104 is to remove unwanted particles immediately after they are disposed on the top EPM surface of the bio-film of the filter modules and to stimulate and modulate the bio-film to prevent thickening and calcification of the EPM layer and to keep it pliable. Once the EPM becomes hardened and thickened, it would resist the penetration of input water, thus depriving the Schmutzdecke of vital nutrient and oxygenated water, leading to rapid extinction of Schmutzdecke colonies. For traditional slow sand filtration, the aging of bio-film could take as little as three to five months. A controlled trimming of the extracellular polymeric substance should drastically prolong the useful life of Schmutzdecke.

Figure 14:
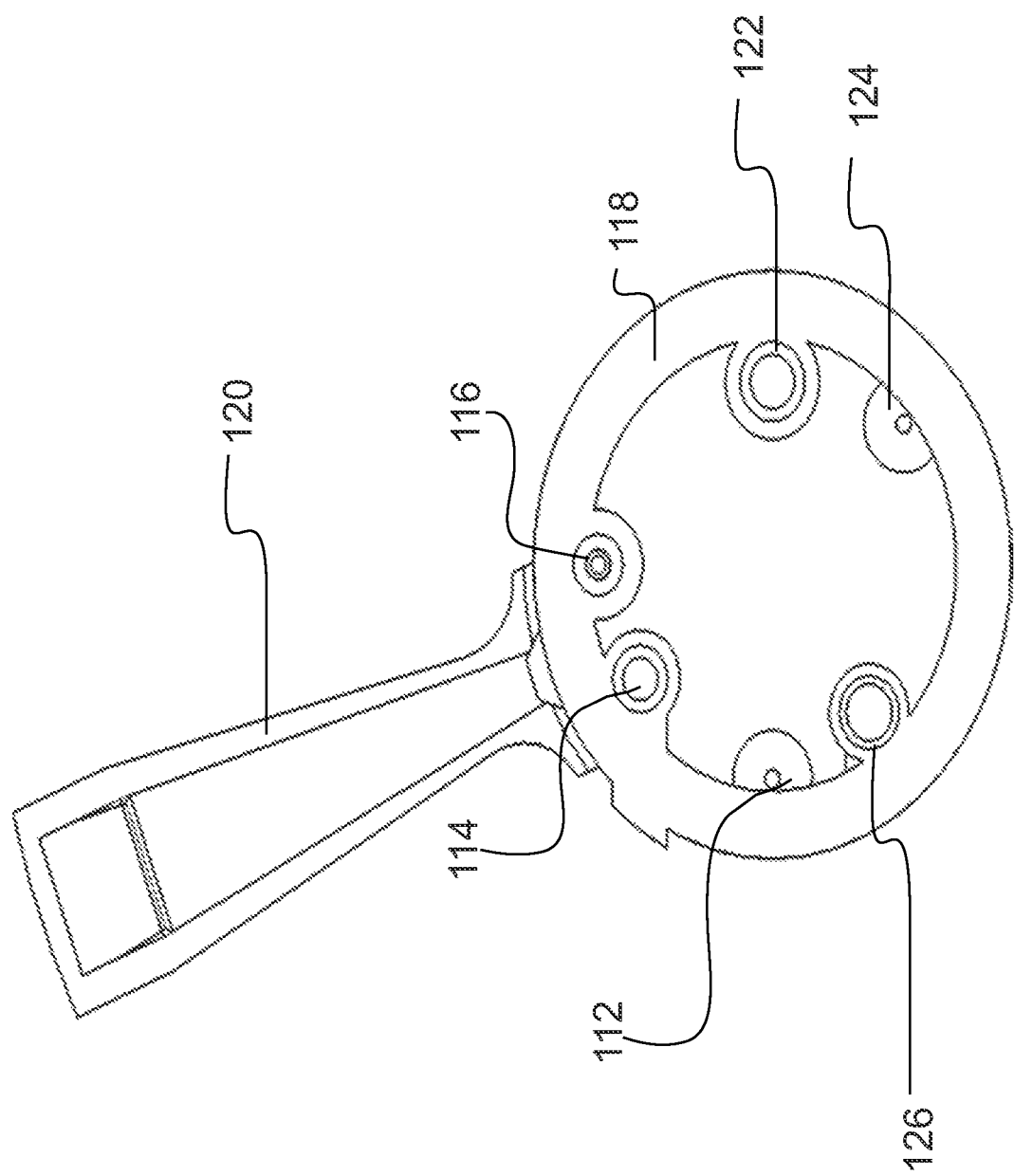
FIG. 14 illustrates a diagram of top view of a skimmer arm.

FIG. 14 illustrates a diagram of top view of a skimmer arm. A skimmer arm 120 can comprise a first idler gear 112, an input water channel 114, a roller spindle 116, an upper stator ring 118, an air exhaust/brine outlet 122, a second idler gear 124, and an air intake/treated water return channel 126.

Figure 15:
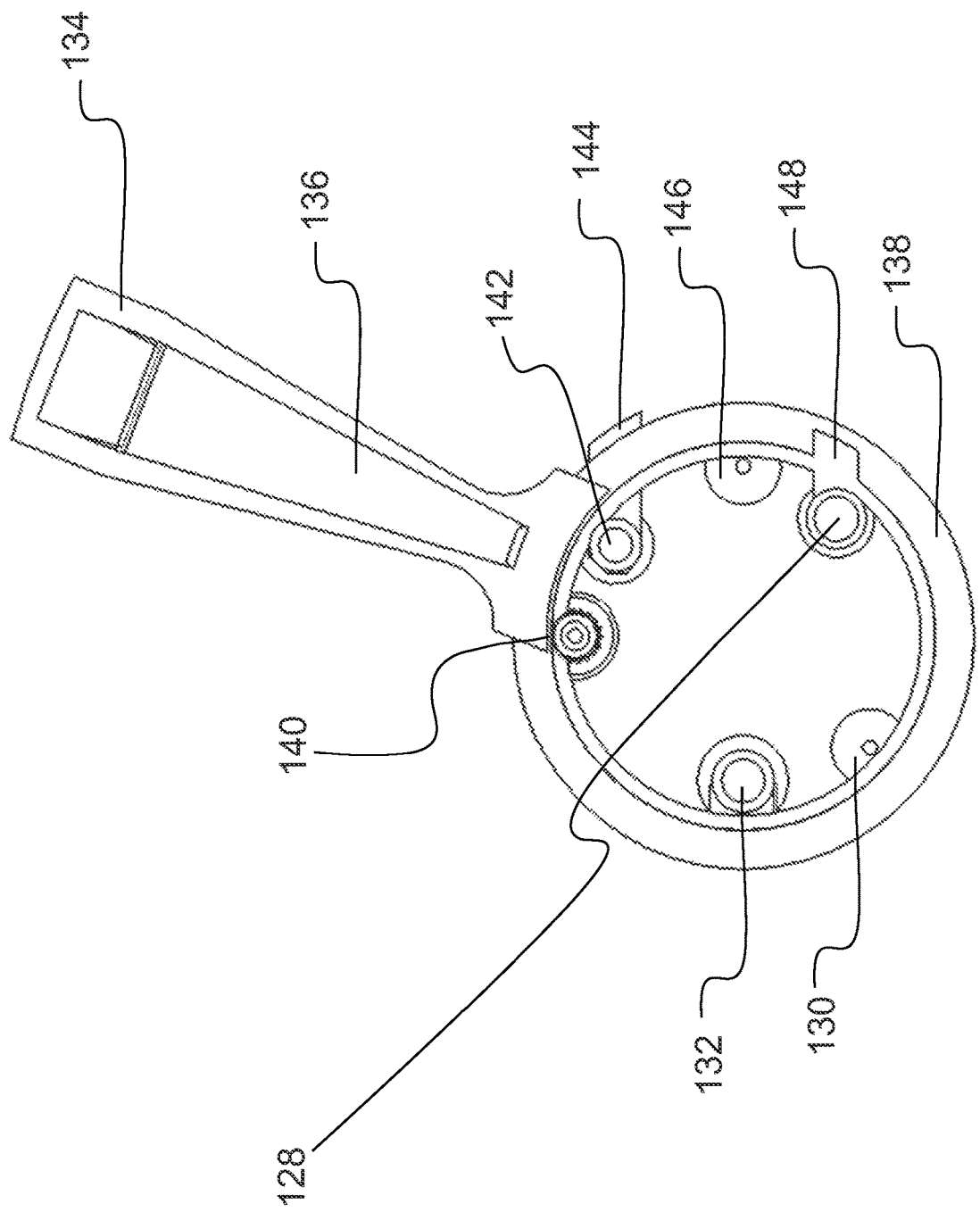
FIG. 15 illustrates a diagram of a bottom view of a skimmer arm.

FIG. 15 illustrates a diagram of a bottom view of a skimmer arm. A skimmer arm 134 can comprise an air intake/treated water return channel 128, a first idler gear 130, an air exhaust/brine outlet 132, a rotating skimmer cavity 136, a lower stator ring 138, a roller spindle 140, an input water channel 142, an input water port 144, a second idler gear 146, and an air intake/treated water return port 148.

A main function of the skimmer arm is to skim/remove excess particulates, which can accumulate on top of a bio-film, and before such particulates are entrenched into the sand media, thereby avoiding the constant build-up of the particulate debris on top of the bio-film and preventing further contamination/impediment. This will prolong the life of the sand media, and keeps the bio-film young and fertile.

The skimmer arm can be propelled by a roller spindle by engaging the inner gears of the skimmer arm to the roller spindle. The skimmer arm can rotate at a speed of approximately one revolution per five to ten minutes, governed by the ability and efficiency of the bacteria to assimilate any newly accumulated debris on the surface of the bio-film, and maintain the "supernatency" of the water.

The idler gears (along with the roller spindle to form a roller bearing for the rotor) are used to keep the rotor (of the rotating arm) horizontally leveled and statically balanced, which facilitate low friction rotary motion of the rotor. The roller spindle which drives the rotor is in turns driven by a drive shaft (not visible). Because of the modular nature of the filter stack, the sectional drive shaft from one filter/biobridge module is rotatably coupled to the corresponding drive shaft of the next module by a key and hole type coupling mechanism. This can permit the use of a single drive motor to drive all the rotary skimmer arms through the common drive shaft formed by the key-hole interlocking of the individual sectioned drive shafts. The skimmer cavity is used to collect the particulate debris, which get swept into it as the arm rotates. Some of the water will also be swept inside, but can be expelled out through the common air exhaust and brine outlet pipe via the effluent air/brine outlet ports. The continual removal of unwanted debris and brine can reduce the rate of accumulation of the same deep within the sand filter media, thereby prolonging the life of the sand media. A concomitant benefit of the continuous skimming also enable the inventive filtration device to handle input water of far greater turbidity than is practical in traditional slow sand or bio sand filtration systems.

The air intake and treated water return pipe and port are used as a conduit for the: (1) compressed air to enter the lower cavity for the purpose of aerating the water to remove the particulates and salt, and also (2) to collect the treated water out of the lower cavity. To make the simultaneous operations of compressed air introduction and treated water collection within the same conduit possible, the diameter of the conduit must be sufficiently large to prevent the blockage of the compressed air flow by the downward running treated water.

Figure 16:
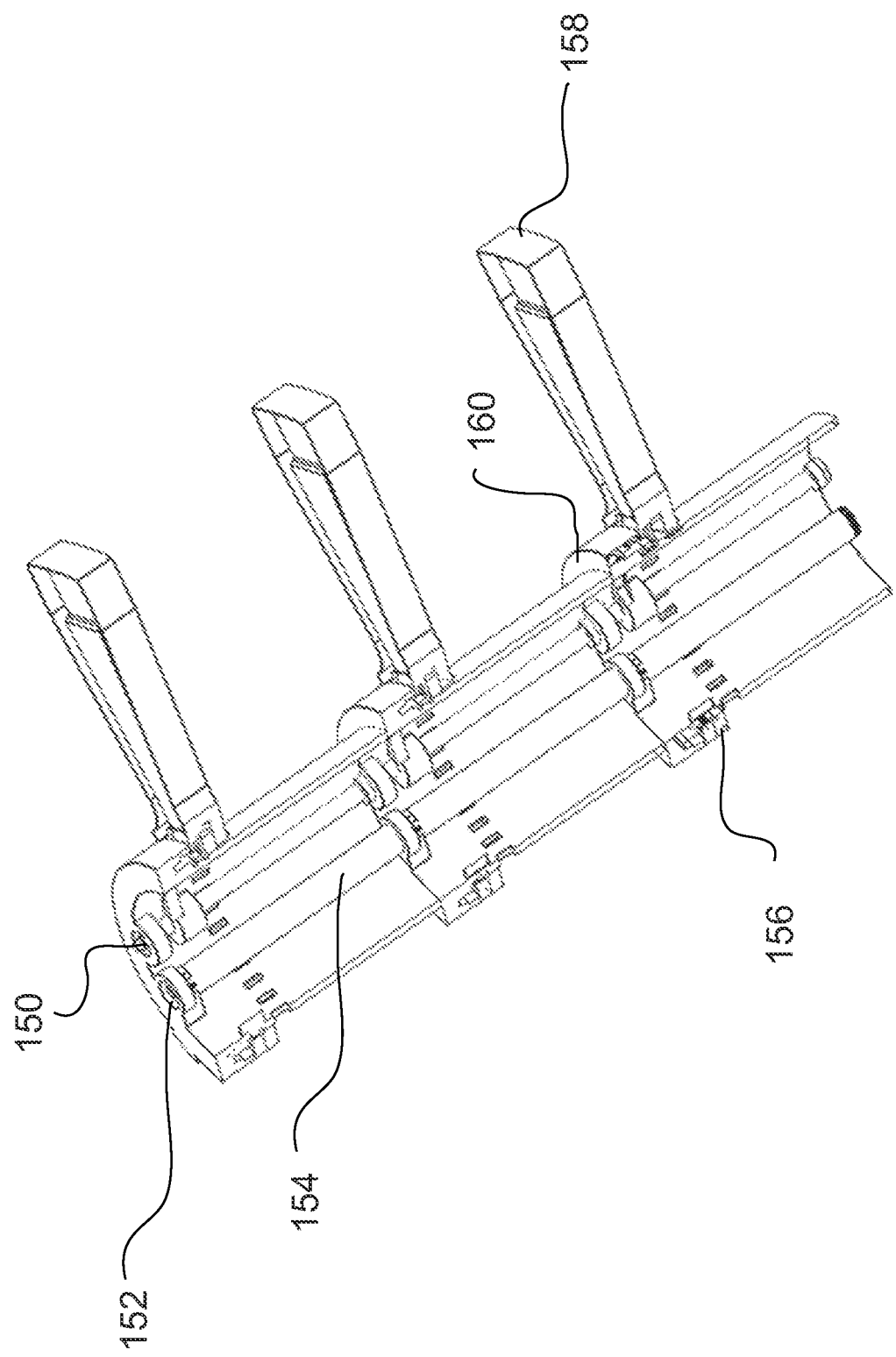
FIG. 16 illustrates a diagram of a cross sectional view of a biobridge with skimmer arms.

FIG. 16 illustrates a cross section view of a triple-stacked biobridge with skimmer arms. Each rotating skimmer arms 158 is attached to the rotor of the corresponding section of the common biobridge. The stator portion of the sectioned biobridge can comprise an air exhaust/brine outlet 150, an input water channel 152, an air intake/treated water return channel 154, lower stator rings 156, and upper stator rings 160. The lower and upper stator rings 156 and 160 provide the mechanical constraint and guides for the rotor. The roller bearings formed from the idlers 112 and the roller spindle 116, together with the upper and lower stator rings, provide a circular rail upon which the rotor motion can rotatably slide with low friction. The interconnected nature of the air intake/treated water return pipes from adjacent biobridge modules is also clearly in evidence.

Figure 17:
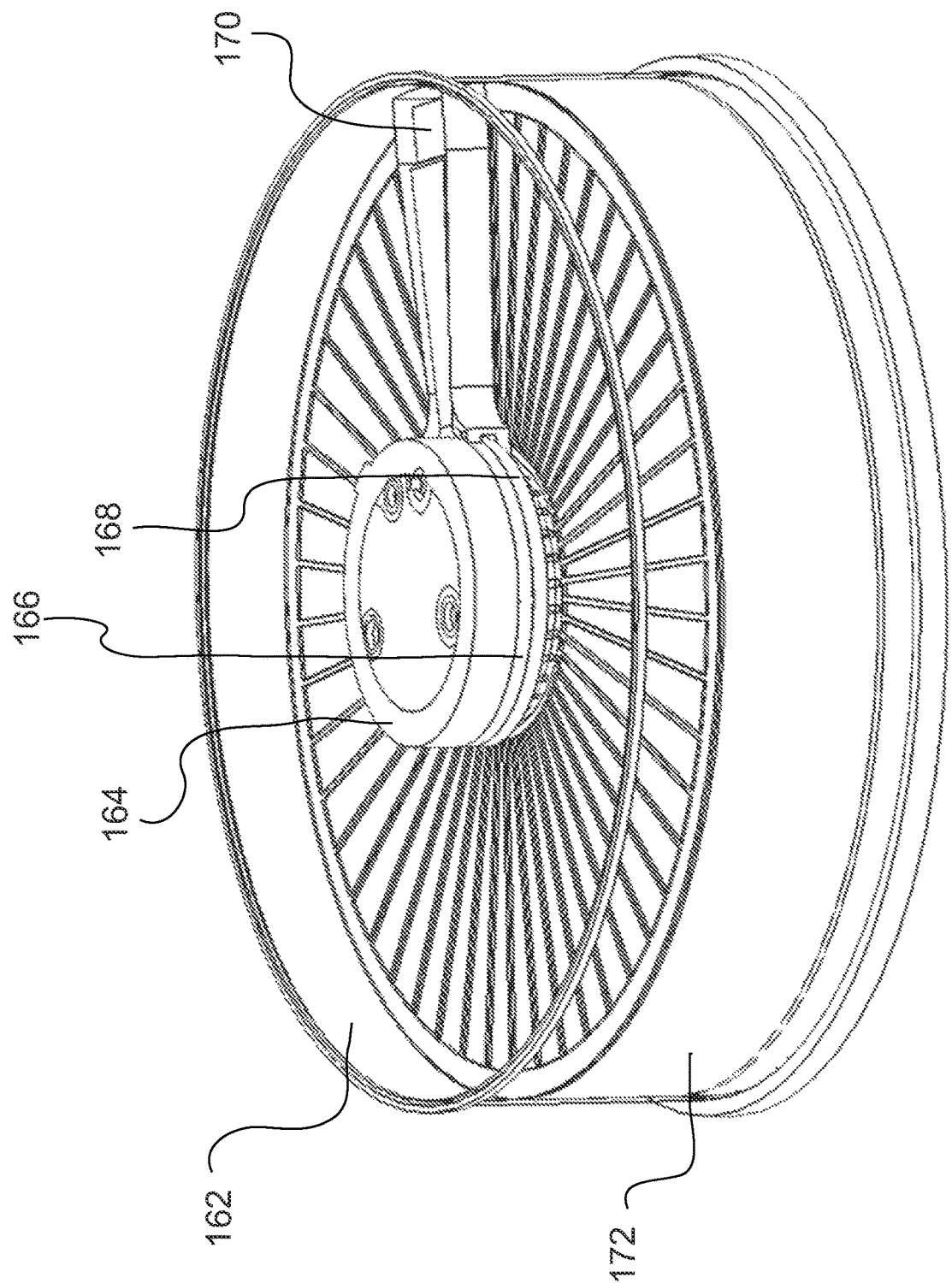
FIG. 17 illustrates a diagram of a filter module.

FIG. 17 illustrates a diagram of a filter module. A fine sand media module 172 having an exterior casing 162 within which the sand media filter module and the sectioned biobridge module reside. The rotating skimmer arm 170 is rotatably coupled to the sectioned biobridge module through a rotor 166 and is constrained by an upper stator ring 164, and a lower stator ring 168 vertically and by the idlers and the roller spindle (not visible). Both the upper and lower stator rings are affixed to the stationary structure of the sectioned biobridge to guide the rotary motion of the rotor. The fine sand media 172 is encased in a semi-permeable geotextile enclosure and supported and constrained by the upper and lower spacers (the lower spacer is not visible). The skimmer arm is held at a slight gap above the upper spacer. The perimeter of the underside of the skimmer arm is preferably affixed with a bristle-like flexible skirt to sustain a slight pressure difference without causing much mechanical wears on the upper spacer or serious abrasive damage to the fragile EPM surface of the bio-film.

Figure 18:
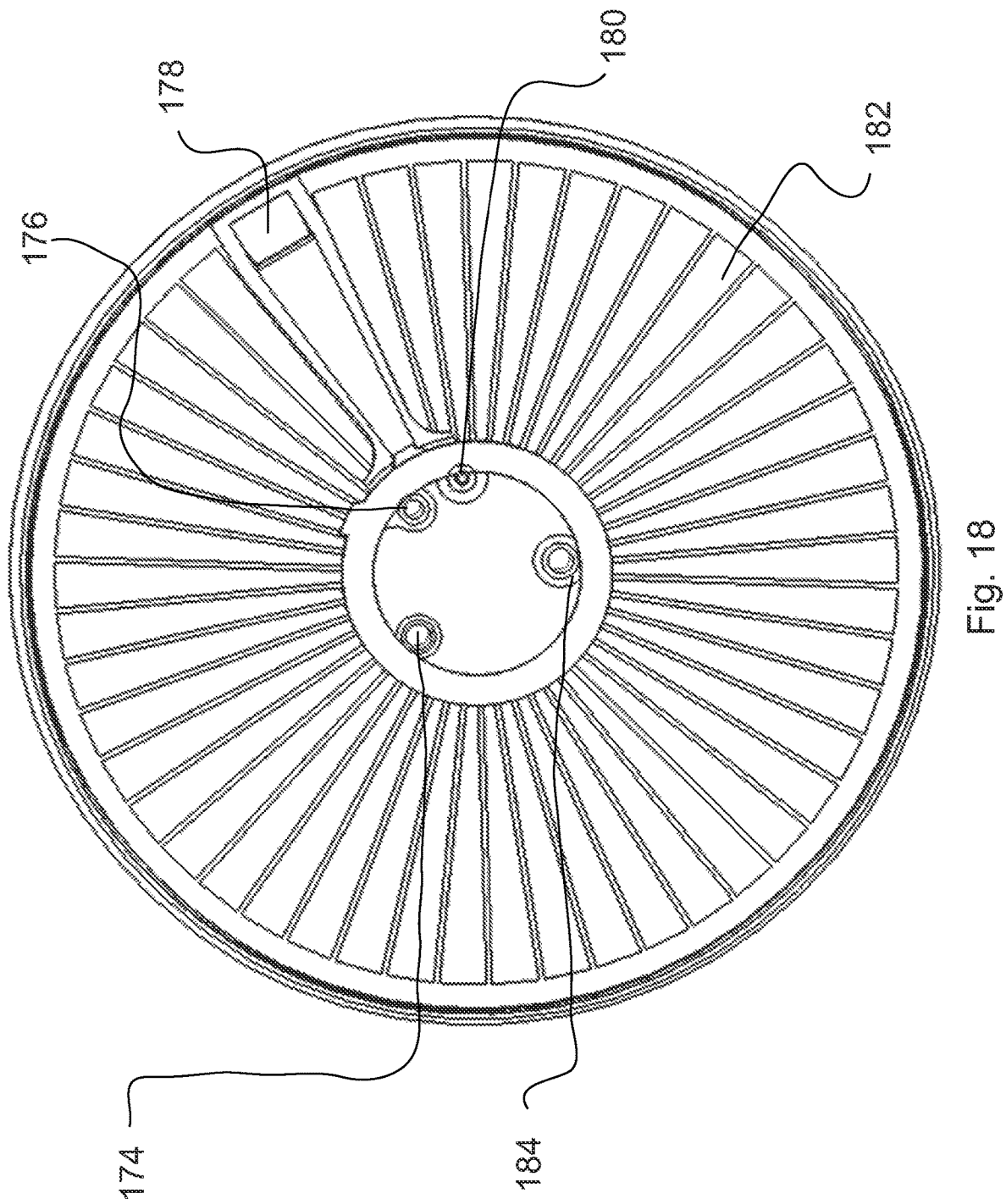
FIG. 18 illustrates a diagram of a top view of a filter module.

FIG. 18 depicts a top bird's eye view of the filter module depicted in FIG. 17. In addition to the fine sand media 172, the rotating skimmer arm 170, the exterior casing 162 and the upper spacer, the input water channel 174, the air exhaust/brine outlet 176, the roller spindle shaft 180, and the air intake/treated water return channel 184 are also evident.

Figure 19:
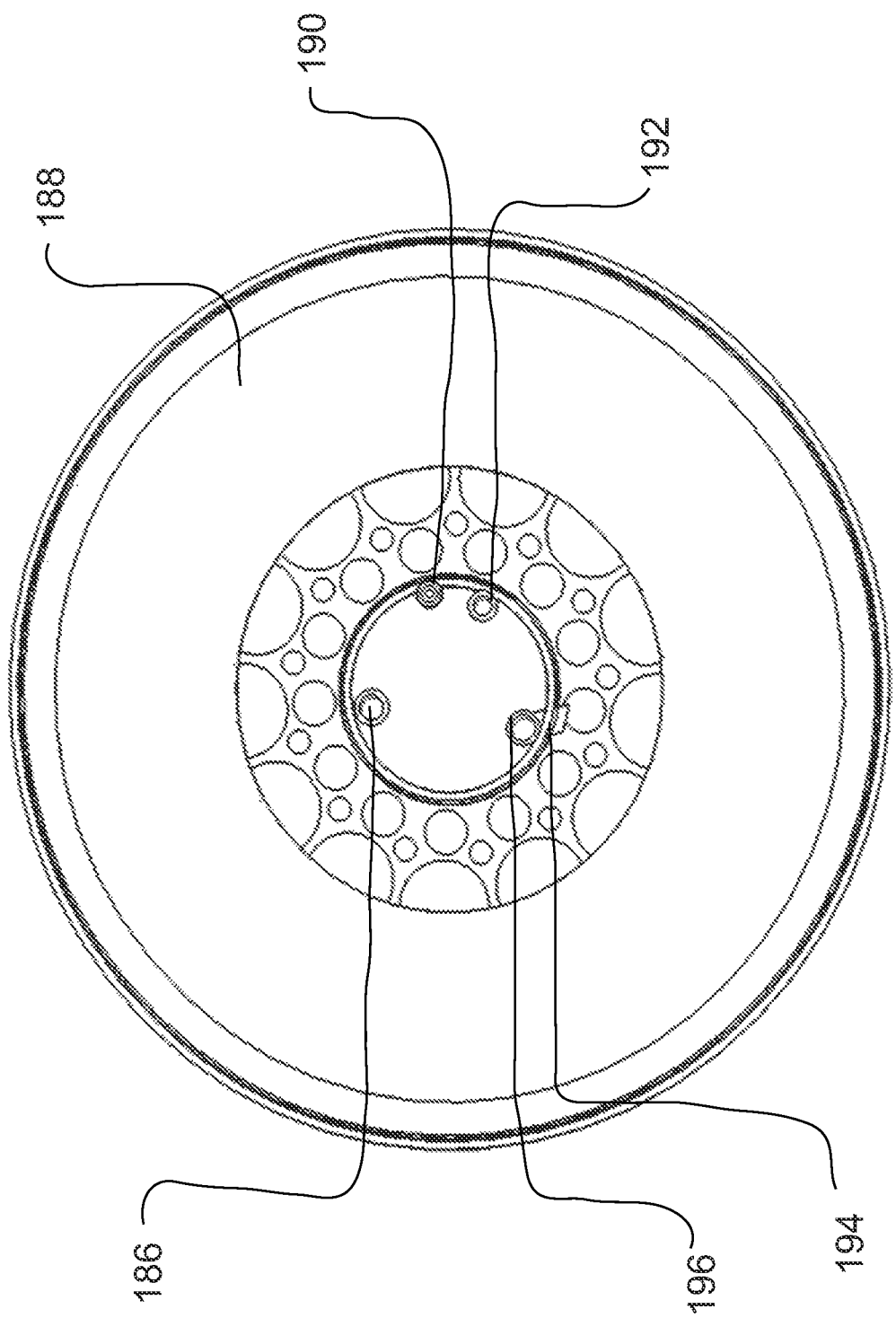
FIG. 19 illustrates a bottom view of a filter module.

FIG. 19 depicts the bottom view of the same filter module as depicted in FIG. 17. The lower spacer is now visible as are the bottom side of the input water channel 174, the air exhaust/brine outlet 176, the roller spindle shaft 180, and the air intake/treated water return channel 184.

Although not explicitly depicted, the input water channel, the air effluent/brine outlet, the roller spindle shaft, and the air intake/treated water return channel, are all designed to mate telescopically and sealed with o-rings and matching grooves in such a way to permit easy interconnections simply by aligning and stacking the respective filter/biobridge modules together. Additional sealant/glue might be required for critical piping such as the treated water return pipe which needs to be completely isolated from possible contaminations by the raw input water. In those cases the additional sealant can be applied before stacking, and the stacking must be done before the sealant is set.

Figure 20:
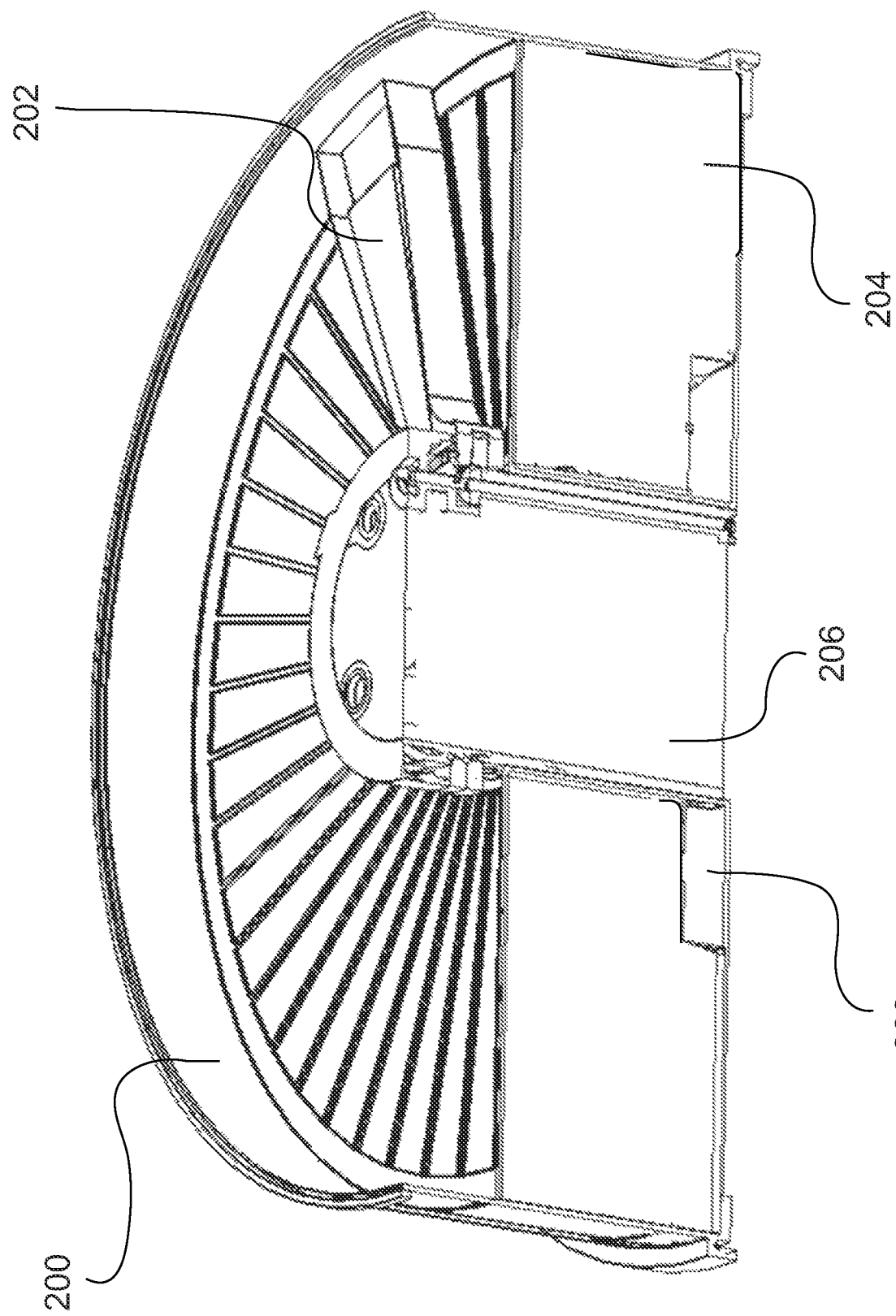
FIG. 20 illustrates a cross sectional view of a filter module.

FIG. 20 illustrates a cross sectional view of the same filter module as depicted in FIG. 17. The rotating skimmer arm 202, the upper cavity 200, fine sand media 204, and the coarse sand media etc. for the biobridge 206 of the filter module are still visible. The cross sectional view also exposes the annular pancake nature of the fine sand media and the fill-in of the biobridge by the coarse media and the buried internal common channels for air intake and exhaust, water intake and outlet, and brine drainage. The lower annular cavity 208 which serves as the treated water collection pan and the entry point for the incoming compressed air is also clearly evident. Compared to the embodiment as depicted in FIG. 6, where the lower annular cavity is away from the biobridge, which necessitates the employment of an outside compressed air intake and treated water return pipe, the common tubing in this embodiment, including the conduit sheath for the drive shaft of the roller spindle, are all neatly tucked inside the biobridge cavity.

Figure 21:
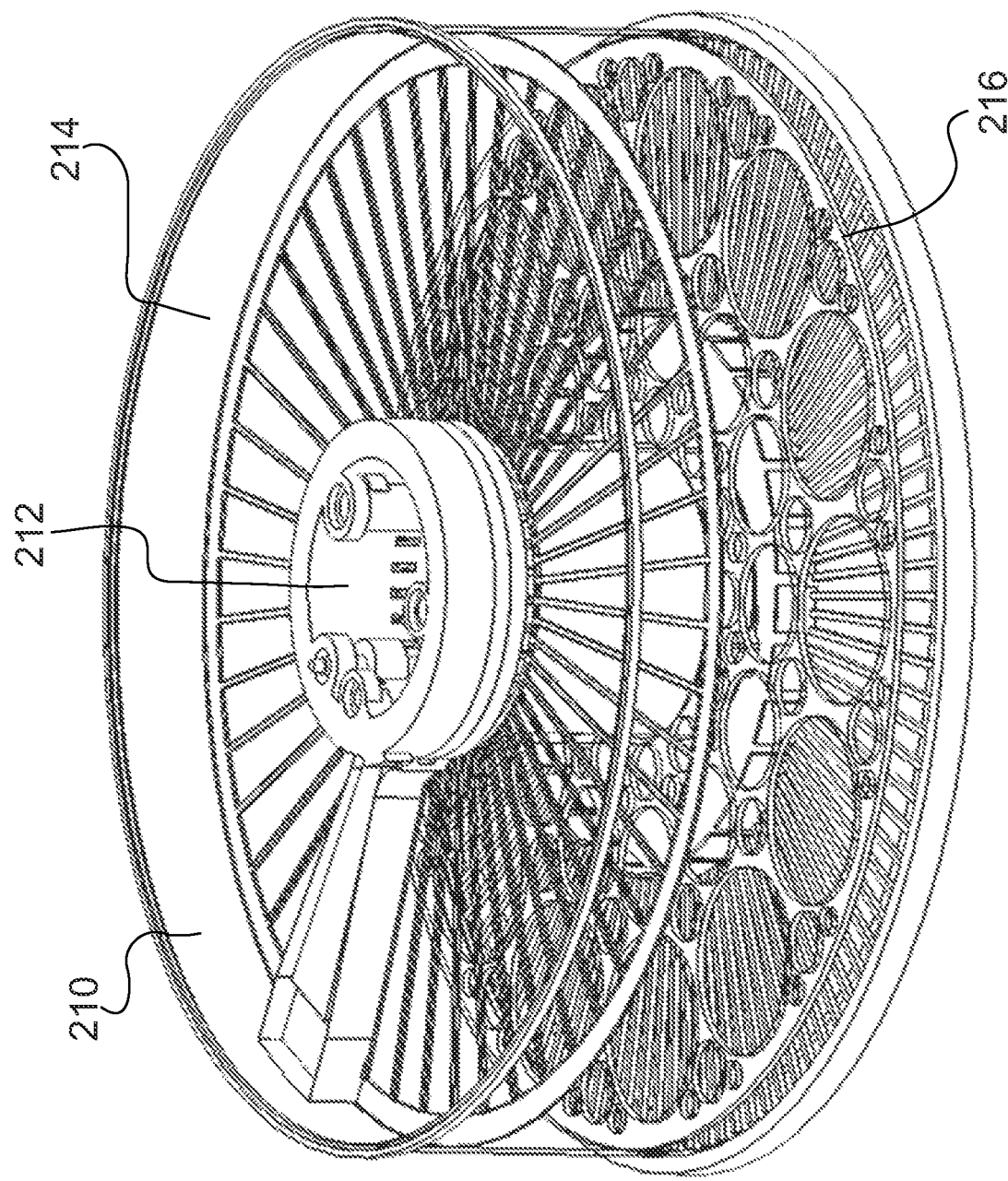
FIG. 21 illustrates another diagram of a filter module.

FIG. 21 illustrates the same filter module as depicted in FIG. 17. Only in this case the fine and coarse sand medium are removed in order to provide a clearer view of the innards of the filter module. The media-less filter module can be seen to have an exterior casing 210, and an upper and lower spacers 213, 215, which, together with a biobridge 212, they define an annular pancake-like space for the geotextile enwrapped fine sand media as well as providing the mechanical support for the latter. Similarly, the wall of the biobridge also defines a space for the coarse sand media which provides limited resources for temporal living space for migrating bacteria. However, since the biobridge is not on the primary path of the input water stream as it has no well defined outlet, any nutrient and oxygen that can be found there are almost entirely the result of the slow diffusion of such materials owing to the concentration gradients of such materials, and as such, biobridge is completely unsuitable for permanent settlement of a bacteria colony. The upper and lower cavities 214 and 216 are also defined by the upper/lower spacers, the biobridge wall, and the fine sand media, as well as the external casing. The radiating rib design for the upper spacer enables the slime that coated the bristle of the rotating skimmer arm to be scraped off against the sharp corners of those radiating ribs as the arm rotates. This prevents the buildup of the slimy EPM substances on the rotating arm.

Figure 22:
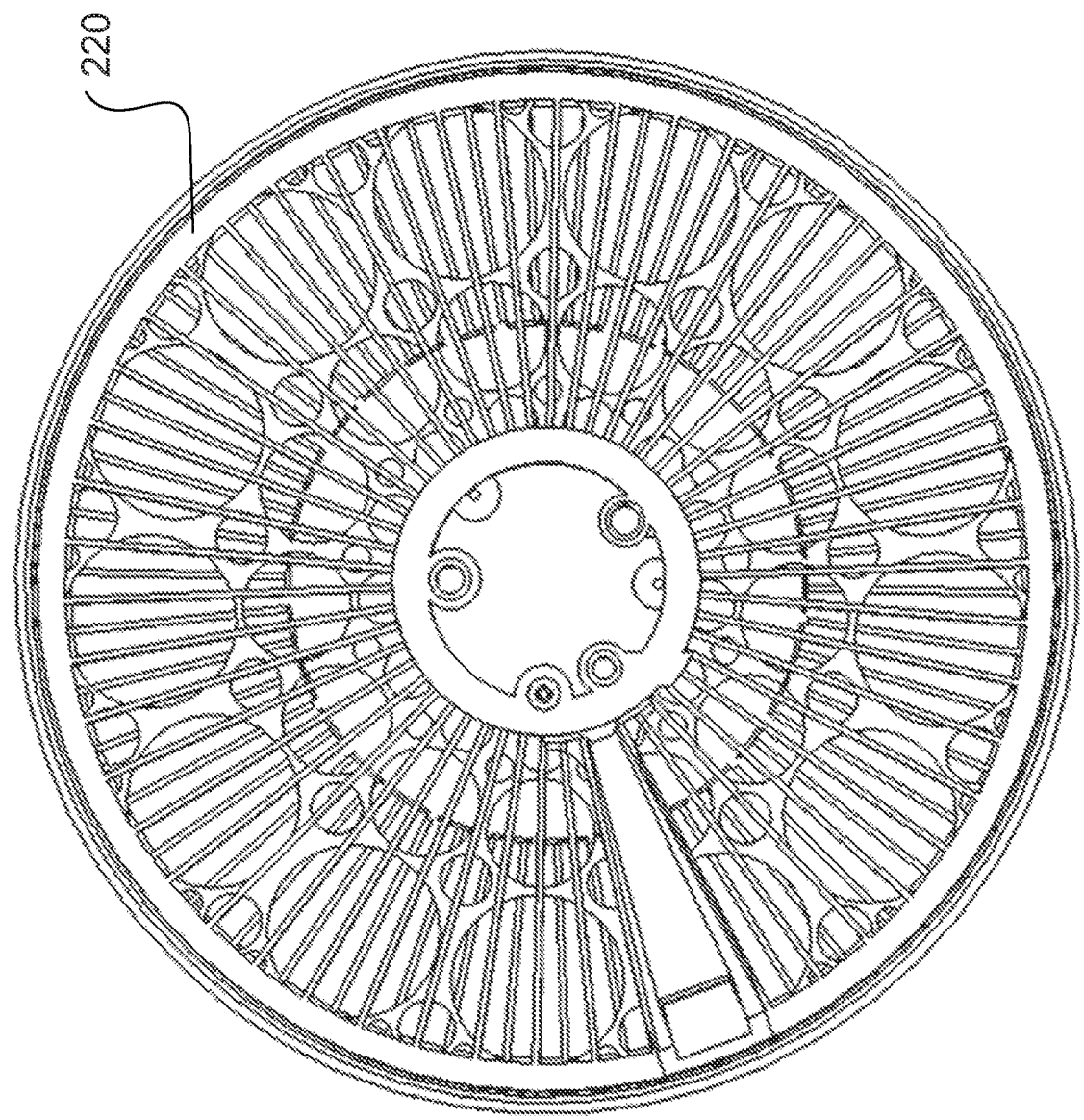
FIG. 22 illustrates another diagram of a top view of a filter module.
Figure 23:
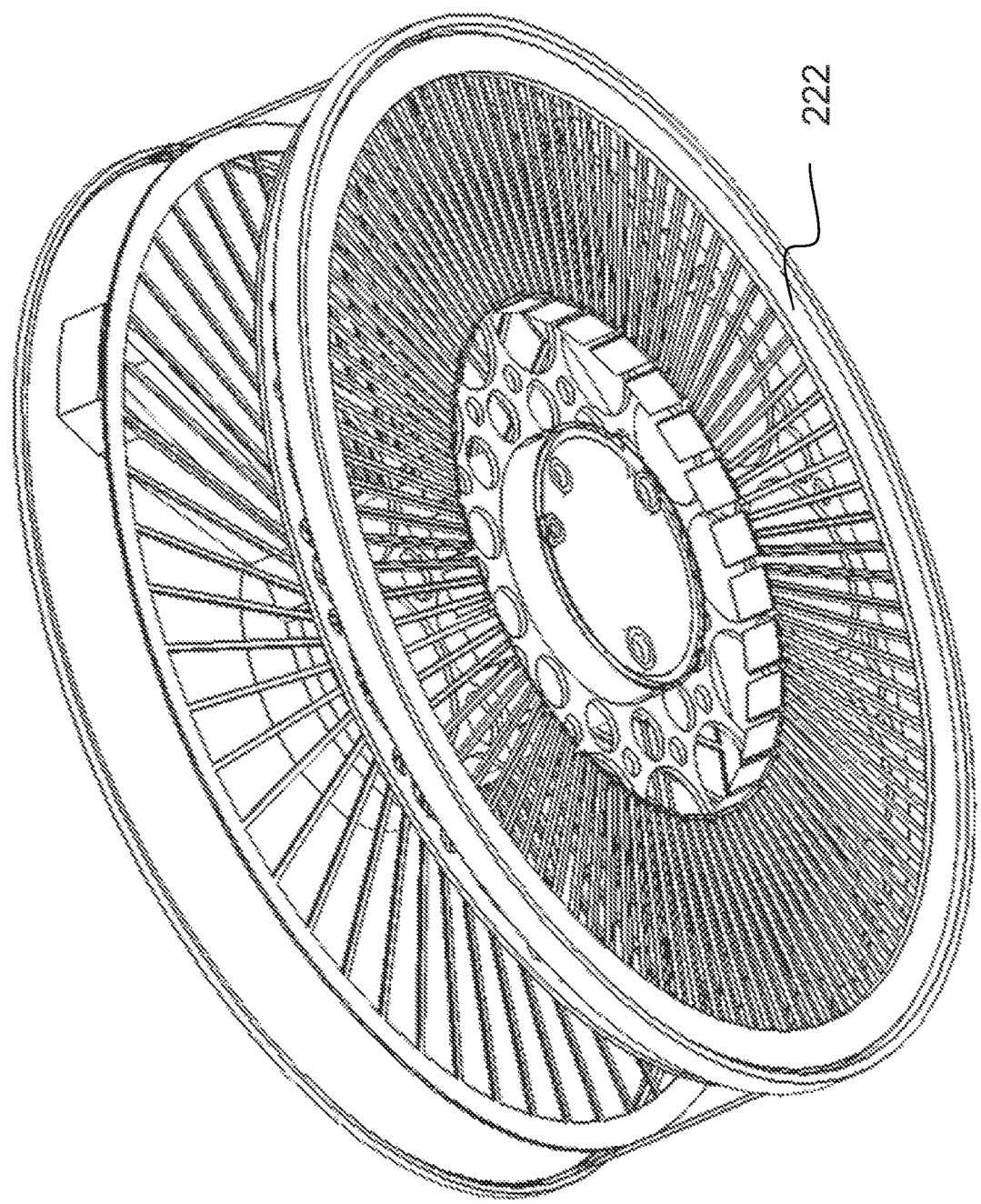
FIG. 23 illustrates another diagram of a bottom view of a filter module.

The radiating rib-like construct of the upper spacer 220 is readily apparent in FIG. 22. The lower spacer 222 comprises of two separate parts. The lower part is seen in FIG. 23 again as a radiating rib structure emanating from the biobridge to the outer rim near the bottom of the exterior casing. As it rests directly on the bottom of the exterior casing, its primary functions are to mechanically support the lowest bottom of the fine sand media and to drain the portion of treated water which reaches the bottom casing surface along the radial direction. The upper part of the lower spacer has a more annular shape with punched holes of various sizes. The holes are made to allow treated water to drip through so that it can be collected on the bottom of the lower cavity, as well as to allow the compressed air to enter the fine sand media to aerate the trickling water.

Figure 24:
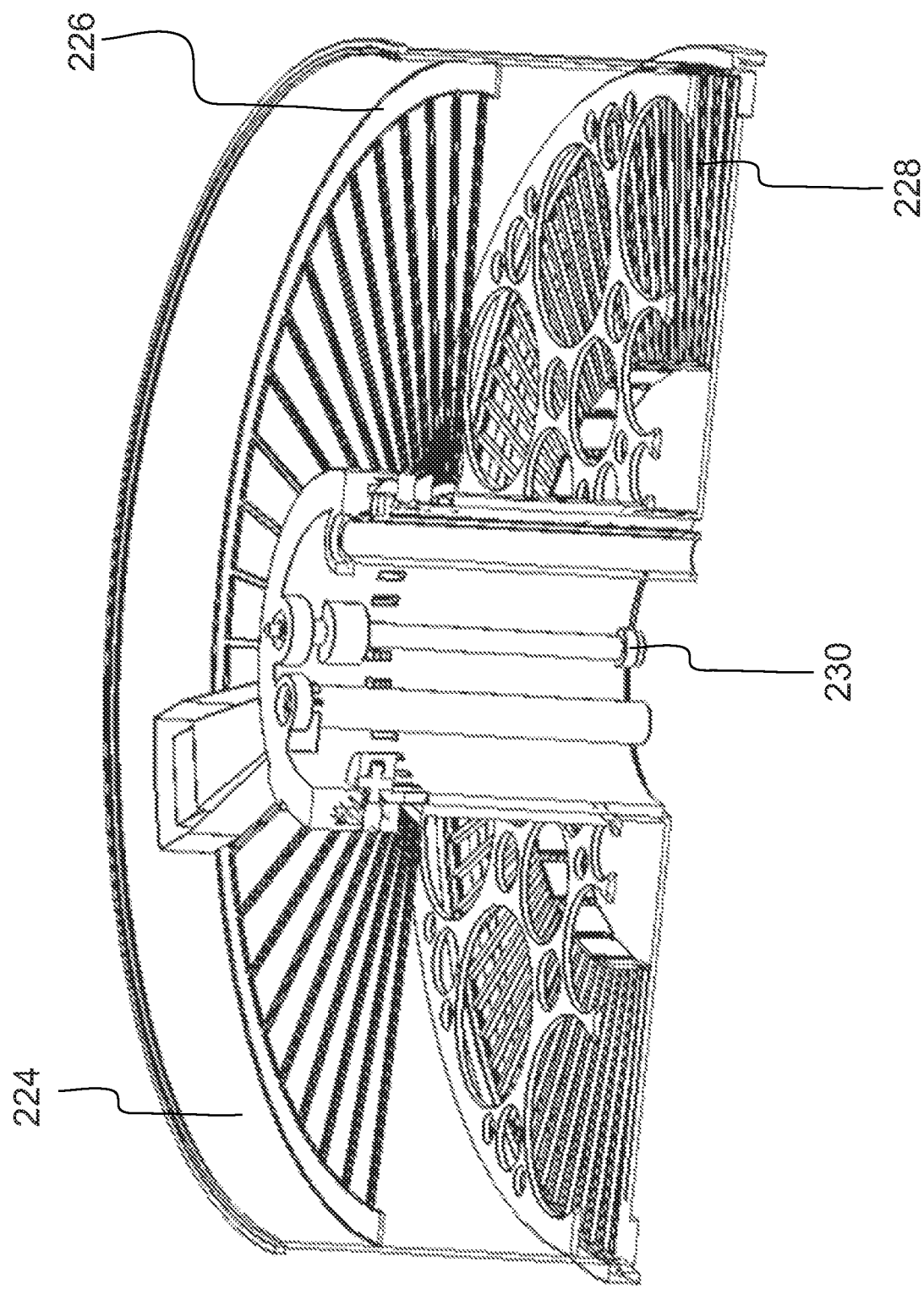
FIG. 24 illustrates another diagram of a cross sectional view of a filter module.

FIG. 24 illustrates a cross sectional view of the filter module (sans sand medium) depicted in FIG. 21. In addition to the upper spacer 226 with its prominent radiating rib construction in clear view, the holey annular upper support and the radiating rib lower support of the lower spacer 228 is readily apparent. The drive shaft conduit 230 for the roller spindle is also readily seen. The midsection semi-circular bulge of the drive shaft conduit houses the roller spindle whose roller is in toothed physical contact with the toothed inner surface of the rotor upon which the rotary skimmer arm is attached. The upper semi-circular bulge of the conduit houses the key-hole locking mechanism.

While the disclosure has been described with reference to certain embodiments, it is to be understood that the disclosure is not limited to such embodiments. Rather, the disclosure should be understood and construed in its broadest meaning, as reflected by the following claims. Thus, these claims are to be understood as incorporating not only the apparatuses, methods, and systems described herein, but all those other and further alterations and modifications as would be apparent to those of ordinary skilled in the art.

We claim:

1. A liquid filtration device, comprising:
   filter modules, wherein each of the filter modules is vertically and serially stacked with respect to a horizontal plane of the filter modules and each filter module has a main layer for a bio-film and zones below the main layer for extra bio-films and a first group of particles, each of the filter modules comprising:
   an input water module port wherein an input liquid is disposed on each of the filter modules, and wherein for each of the filter modules the input liquid is filtered,
   a treated water module port wherein a treated water is filtered from each of the filter modules by passing through the respective main layer and the respective first group of particles of each filter module,
   an intake air module port and an effluent air module port,
   a biobridge stackable section of each of the filter modules comprising a center post of openings configured to couple the biobridge to each filter module and to share a pulsed cycles per second compressed air and the input liquid with each filter module across the bio-films in a loosely packed media comprised in the biobridge to produce a constant output water flow rate;
   a treated water return pipe in communication with the treated water module ports;
   an intake air pipe in communication with the intake air module ports; and
   an effluent air pipe in communication with the effluent air module ports,
   wherein the treated water return pipe and the intake air pipe are a shared pipe.

2. The liquid filtration device of claim 1, wherein the certain one of the modular skimmers is rotatable about an axis through the certain one of the filter modules via a rotor disposed around a stationary section of the biobridge and wherein the certain one of the modular skimmers removes particles disposed on a top side of the bio-film of the certain one of the filter modules.

3. The liquid filtration device of claim 2 wherein the certain one of the modular skimmers reduces the bio-film of the certain one of the filter modules to a predefined height via a bristle-like flexible skirt affixed to an underside of the modular skimmer.

4. The liquid filtration device of claim 1 wherein the biobridge comprises a second group of particles, wherein the second group of particles is coarser than the first group of particles.

5. The liquid filtration device of claim 1 wherein the bio-film in one filter module is connected to the bio-film in another filter module via the biobridge.

6. The liquid filtration device of claim 5 wherein a select microorganism is propagated from a certain one of the bio-films to one or more other ones of the bio-films via the biobridge.

7. The liquid filtration device of claim 1 wherein the biobridge is pre-seeded with a select microorganism.

8. The liquid filtration device of claim 1, wherein the biobridge is encased in a semi-permeable polymer membrane.

9. The liquid filtration device of claim 1 further comprising a compressor having a gas exhaust and a gas intake, wherein a first gas is driven through the filter modules via the gas exhaust and the gas intake in a pulsed cycles per second manner.

10. A liquid filtration device, comprising:
    filter modules, wherein each of the filter modules has a main layer for a bio-film and zones below the main layer for extra bio-films and a first group of particles and wherein the filter modules are vertically and serially stacked with respect to a horizontal plane of each filter module;
    skimmers, wherein a certain one of the skimmers is coupled to a certain one of the filter modules, wherein the certain one of the skimmers is rotatable about an axis through the certain one of the filter modules, and wherein the certain one of the skimmers removes particles disposed on a top side of the bio-film of the certain one of the filter modules;
    an input water module port in each filter module, wherein an input liquid is disposed on each of the filter modules, and wherein for each of the filter modules the input liquid is filtered;
    a treated water module port in each filter module, wherein a treated water is filtered from each of the filter modules by passing through the respective main layer and the respective first group of particles of each filter module;
    an intake air module port and an effluent air module port in each filter module;
    a biobridge stackable section of each of the filter modules comprising a center post of openings configured to couple the biobridge to each filter module and to share a pulsed cycles per second compressed air and the input liquid with each filter module across the bio-films in a loosely packed media comprised in the biobridge;
    a treated water return pipe in communication with the treated water module ports;
    an intake air pipe in communication with the intake air module ports; and
    an effluent air pipe in communication with the effluent air module ports,
    wherein the treated water return pipe and the intake air pipe are a shared pipe.

11. The liquid filtration device of claim 10 wherein the biobridge comprises stackable biobridge modules including sectioned common and aligned channels for input water, effluent air outlet, treated water return and a sealed motorized rotary shaft.

12. The liquid filtration device of claim 10 wherein the biobridge and the filter modules respectively comprise stackable biobridge modules and stackable filter modules comprising aligned and common channels for critical piping sealed with o-rings.

13. The liquid filtration device of claim 10 wherein the bio-films are connected to each other via the biobridge.

14. The liquid filtration device of claim 13 wherein a select microorganism is propagated from a certain one of the bio-films to one or more other ones of the bio-films via the biobridge.

15. The liquid filtration device of claim 10 wherein the biobridge is pre-seeded with a select microorganism.

16. The liquid filtration device of claim 15 wherein the select microorganism is propagated from the biobridge to the filter modules.

17. The liquid filtration device of claim 10 further comprising a compressor having a gas exhaust and a gas intake, wherein a first gas is driven through the filter modules via the gas exhaust and the gas intake in a pulsed cycles per second manner.

18. A liquid filtration device, comprising:

filter modules, wherein each of the filter modules has a main layer for a bio-film and zones below the main layer for extra bio-films and a first group of particles and wherein the filter modules are vertically and serially stacked with respect to a horizontal plane of each filter module;

skimmers, wherein a certain one of the skimmers is coupled to a certain one of the filter modules, wherein the certain one of the skimmers is rotatable about an axis through the certain one of the filter modules, wherein the certain one of the skimmers removes particles disposed on a top side of the bio-film of the certain one of the filter modules, and wherein the certain one of the skimmers reduces the bio-film of the certain one of the filter modules to a predefined height;

a compressor having a gas exhaust and a gas intake, wherein a first gas is driven through the filter modules via the gas exhaust and the gas intake in a pulsed cycles per second manner;

an input water module port in each filter module wherein an input liquid is disposed on each of the filter modules, and wherein for each of the filter modules the input liquid is filtered;

a treated water module port in each filter module wherein a treated water is filtered from each of the filter modules by passing through the respective main layer and the respective first group of particles of each filter module;

an intake air module port and an effluent air module port in each filter module;

a biobridge stackable section of each of the filter modules comprising a center post of openings configured to couple the biobridge to each filter module and to the pulsed cycles per second compressed air and the input liquid with each filter module across the bio-films in a loosely packed media comprised in the biobridge, wherein the biobridge comprises a second group of particles, wherein the second group of particles is coarser than the first group of particles, wherein the bio-films are connected to each other via the biobridge, wherein a select microorganism is propagated from a certain one of the bio-films to one or more other ones of the bio-films via the biobridge, wherein the biobridge is pre-seeded with a select microorganism, and wherein the select microorganism is propagated from the biobridge to the filter modules;

a treated water return pipe in communication with the treated water module ports;

an intake air pipe in communication with the intake air module ports; and an effluent air pipe in communication with the effluent air module ports, wherein the treated water return pipe and the intake air pipe are a shared pipe.

* * * * *